(12) United States Patent
Frouin et al.

(10) Patent No.: US 11,384,018 B2
(45) Date of Patent: Jul. 12, 2022

(54) GROUND GRANULATED BLAST FURNACE SLAG BASED BINDER, DRY AND WET FORMULATIONS MADE THEREFROM AND THEIR PREPARATION METHODS

(71) Applicants: ECOCEM MATERIALS LIMITED, Dublin (IE); ECOCEM FRANCE, Aix-en-Provence (FR); Ecole Normale Supérieure de Cachan, Cachan (FR)

(72) Inventors: Laurent Frouin, Paris (FR); Mohend Chaouche, Cachan (FR); Artur Kiiashko, Cachan (FR); Nicolas Musikas, Paris (FR)

(73) Assignees: ECOCEM MATERIALS LIMITED, Dublin (IE); ECOCEM FRANCE, Aix-en-Provence (FR); ECOLE NORMALE SUPÉRIEURE DE CACHAN, Cachan (FR)

( * ) Notice: Subject to any disclaimer, the term of this patent is extended or adjusted under 35 U.S.C. 154(b) by 0 days.

(21) Appl. No.: 16/770,649

(22) PCT Filed: Nov. 16, 2018

(86) PCT No.: PCT/EP2018/081608
§ 371 (c)(1),
(2) Date: Jun. 8, 2020

(87) PCT Pub. No.: WO2019/110280
PCT Pub. Date: Jun. 13, 2019

(65) Prior Publication Data
US 2021/0238094 A1   Aug. 5, 2021

(30) Foreign Application Priority Data

Dec. 8, 2017 (WO) ................ PCT/EP2017/082110

(51) Int. Cl.
| | | |
|---|---|---|
| *C04B 28/08* | (2006.01) | |
| *C04B 14/28* | (2006.01) | |
| *C04B 22/06* | (2006.01) | |
| *C04B 22/10* | (2006.01) | |
| *C04B 22/14* | (2006.01) | |
| *C04B 22/16* | (2006.01) | |
| *C04B 24/00* | (2006.01) | |
| *C04B 24/12* | (2006.01) | |
| *C04B 24/26* | (2006.01) | |

(Continued)

(52) U.S. Cl.
CPC ............ *C04B 28/082* (2013.01); *C04B 14/28* (2013.01); *C04B 22/062* (2013.01); *C04B 22/10* (2013.01); *C04B 22/147* (2013.01); *C04B 22/16* (2013.01); *C04B 24/003* (2013.01); *C04B 24/121* (2013.01); *C04B 24/2641* (2013.01); *C04B 28/12* (2013.01); *C04B 2103/10* (2013.01); *C04B 2103/32* (2013.01); *C04B 2103/60* (2013.01); *C04B 2111/00482* (2013.01); *C04B 2111/00637* (2013.01); *C04B 2111/00663* (2013.01); *C04B 2111/60* (2013.01)

(58) Field of Classification Search
CPC ....... C04B 14/28; C04B 22/062; C04B 22/10; C04B 22/16; C04B 22/147; C04B 24/003; C04B 24/121; C04B 24/2641; C04B 28/082; C04B 28/12; C04B 2103/10; C04B 2103/32; C04B 2103/60; C04B 2111/00482; C04B 2111/00637; C04B 2111/00663; C04B 2111/60
See application file for complete search history.

(56) References Cited

U.S. PATENT DOCUMENTS

| | | | |
|---|---|---|---|
| 5,361,842 A | 11/1994 | Hale et al. | |
| 6,613,142 B1 * | 9/2003 | D'Almeida | ............. C04B 28/08 |
| | | | 106/789 |
| 9,656,918 B2 * | 5/2017 | Kuryatnyk | ............. C04B 28/08 |

FOREIGN PATENT DOCUMENTS

| | | |
|---|---|---|
| CN | 102 180 613 | 9/2011 |
| CN | 102603217 | 7/2012 |

(Continued)

OTHER PUBLICATIONS

F. Collins et al., "Early Age Strength and Wokability of Slag Pastes Activated by NaOH and $Na_2CO_3$", Cement and Concrete Research, vol. 28, No. 5, pp. 655-664, 1998.

(Continued)

*Primary Examiner* — Anthony J Green
(74) *Attorney, Agent, or Firm* — Clark & Brody LP

(57) ABSTRACT

A slag-based binder has at least one slag, optionally at least one $CO_3$-containing mineral powder, optionally at least one co-binder different from the slag and mineral powder, at least one activator of the water/slag reaction, optionally at least one co-activator different from the one activator, at least one chelatant and/or at least one source of chelatant, said chelatant being preferably a scale inhibitor, and, optionally, at least one superplasticizer different from the chelatant. A kit is provided to make the binder. The binder is combined with an aggregate to make a dry concrete or mortar. A method for the preparation of a wet formulation (binder/water or concrete-mortar/water) is disclosed as is method of manufacturing buildings or civil engineering works or elements thereof, coatings, fillers, screeds, tiles, adhesives and/or internal or external insulation systems from the wet formulation. The binder is a substitute to OPC-based compositions and is environmentally friendly.

18 Claims, 17 Drawing Sheets

(51) Int. Cl.
- *C04B 28/12* (2006.01)
- *C04B 103/10* (2006.01)
- *C04B 103/32* (2006.01)
- *C04B 103/60* (2006.01)
- *C04B 111/00* (2006.01)
- *C04B 111/60* (2006.01)

(56) References Cited

FOREIGN PATENT DOCUMENTS

| | | |
|---|---|---|
| CN | 103693870 | 4/2014 |
| CN | 104355584 A * | 2/2015 |
| CN | 105236879 A * | 1/2016 |
| CN | 106478048 A * | 3/2017 |
| EP | 0 567 025 | 10/1993 |
| FR | 3 031 103 | 7/2016 |
| WO | 87/02354 | 4/1987 |
| WO | 2010/017571 | 2/2010 |
| WO | 2014/067721 | 5/2014 |
| WO | 2015/034478 | 3/2015 |
| WO | 2015/087255 | 6/2015 |
| WO | WO-2015199291 A1 * 12/2015 | ............. C04B 28/04 |
| WO | 2016/146251 | 9/2016 |
| WO | 2017/116312 | 7/2017 |

OTHER PUBLICATIONS

Xinyuan Ke et al., "Controlling the reaction . . . layered double hydroxides", Cement and Concrete Research 81 (2016) 24-37.

* cited by examiner

US 11,384,018 B2

GROUND GRANULATED BLAST FURNACE SLAG BASED BINDER, DRY AND WET FORMULATIONS MADE THEREFROM AND THEIR PREPARATION METHODS

FIELD OF THE INVENTION

The technical field of the invention relates to hydraulic mineral binders including at least one slag, for instance a Ground Granulated Blast furnace Slag (GGBS or slag), which are used in settable and hardenable compositions, such as mortar or concrete compositions.

More particularly, the invention relates to binders and to settable and hardenable compositions for the building industry, which include at least one slag as hydraulic binder as well as at least one functional additive.

The invention concerns also the methods of preparation of these slag-based binders, of these dry or wet settable and hardenable compositions.

The building applications made of the set and hardened products obtained from these compositions are also in the field of the invention.

BACKGROUND ART

Portland cement production has a strong and negative impact on the environment due to the emissions of large quantities of carbon dioxide. The production of cement inherently generates $CO_2$ during the calcination of the raw materials at very high temperature (1450° C.) in a furnace through decarbonation of the limestone (Eq. (1)):

$$CaCO_3(s) \rightarrow CaO(s) + CO_2(g) \qquad (1)$$

In addition, carbon dioxide is released as a result of the combustion of the fossil fuels needed to heat the furnace. By adding the additional emissions of grinding, we obtain almost one ton of $CO_2$ per ton of Portland cement. Overall, the cement industry is responsible for 7-9% of the global carbon dioxide emissions.

The detrimental impact of the Portland cement is aggravated by its high demand in water for the complete hydration.

Moreover, handling Portland cement may lead to health issues (such as allergy) due in particular to its high alkalinity (pH higher than 13). In addition, hazardous elements as hexavalent Chromium (Cr (VI)) may be released upon kneading, which is also toxic for the workers. Although Cr (VI) reducing agents (as ferrous sulfate) are normally included in the cement powder, their efficiency is limited in time. Building workers, in particular those in the third world, are not expected to often check the deadline related to such treatments.

Most current research on new binders aims to replace cement in various applications by binders with lower environmental impact. One route is through using resources without their expensive treatment, such as by-products from other industries (waste for one industry, but primary resource for others). This is the case of blast-furnace slag which a by-product of iron industry. By grinding this product into fine powder (GGBS) one can obtain a cementitious material that can be used in partial substitution of cement or used alone by adding some chemical activators (such as alkalis or sulfates).

It is important to note that the use of a GGBS is not only environmentally-friendly but also leads to several enhanced properties such as high resistance to sulfate attack, low permeability, good resistance in a chemically aggressive environment, low heat of hydration (required in massive structures), excellent durability in general, possibility of immobilization of heavy metals or radionuclides, etc.

Another benefit of GGBS based products is their low water demand to get appropriate rheological properties. This is also important from both environmental and societal point of view. Indeed there is a dramatic reduction of water resources over the world, not only in arid regions, leading in particular to geopolitical tensions and wars. In this regard the benefits of decreasing the amount kneading water used in cementitious is not anecdotal taking into account the huge amount of cementitious materials consumed over the world.

Furthermore, the presence of slag in a cementitious binder is known to reduce the release of the toxic Cr (VI).

Addressing these environmental and toxicological issues should not be detrimental neither to the appropriate rheology nor to the final hardened product properties, namely mechanical strength and durability, which are directly linked to the final porosity of the hardened product.

Another parameter to be controlled is the ratio water/binder (W/B) which should be lower than or equal to 1.0, preferably 0.7, and more preferably 0.4 or 0.35.

Alkaline-Activated Slag cements (AAS) are possible substitutes to Ordinary Portland Cement (OPC).

WO2015087255A1 discloses an alkaline-activated slag composition including:
- a source of slag: blast furnace slag (BFS);
- a source of an alkali metal carbonate (activator) comprising 0.5 to 6.0 in the metal oxide equivalent (i.e. $Na_2O$ for $Na_2CO_3$) weight % of the source of slag: sodium carbonate, potassium carbonate and lithium carbonate;
- a source of an amorphous polymorph of silicon dioxide comprising 0.5 to 10.0 weight % of the source of slag: silica fume;
- a source of an alkaline metal hydroxide comprising 0.5 to 10.0 weight % of the source of slag: slaked lime;
- a source of non-aqueous plasticizer in the form of sodium lignosulfonate;
- possibly some aggregates like stone or sand.

This alkaline-activated slag composition could be improved regarding the provision of an optimized concrete/mortar wet formulation obtained after mixing said composition with aggregates and with water.

Said optimized concrete/mortar wet formulation could have a lower Water/Binder (W/B) ratio, for instance lower than or equal to 1.0, preferably 0.7, and more preferably 0.4 or 0.35, while having a good workability for instance as defined by ACI Standard 116R-90 (ACI 1990b) as 'that property of freshly mixed concrete/mortar which determines the ease and homogeneity with which it can be mixed, placed, consolidated and finished'. ASTM defines it as "that property determining the effort required to manipulate a freshly mixed quantity of concrete/mortar with minimum loss of homogeneity". The reference test for workability of a wet concrete/mortar formulation is the "slump test".

In others words, it means a stable rheology during open time of several hours, e.g. 1 to 3 hours.

These suitable application properties should be got without increasing the W/B ratio. Indeed, excess of water could maintain the rheology adapted to a good workability during the required setting time, but it would jeopardize dramatically the mechanical characteristics of the hardened concrete/mortar.

Furthermore, it is also preferable to limit the concentration and set retarder in the concrete/mortar composition, as far as careful usage of retarder is preferable to control the costs and to avoid excessive retardation, rapid slump loss and excessive plastic shrinkage (change in fresh concrete/ mortar volume as surface water evaporates).

OBJECTIVES OF THE INVENTION

In this context, the invention aims at addressing at least one of the above problems and/or needs, through fulfilling at least one of the following objectives:
— O1—Providing a slag-based binder or a mortar or concrete composition including said slag-based binder, which is attractive substitute to OPC-based compositions.
— O2—Providing a slag-based binder or a mortar or concrete composition including said slag-based binder, which is environmentally friendly.
— O3—Providing a slag-based binder or a mortar or concrete composition including said slag-based binder, which is cheap and competitive.
— O4—Providing a slag-based binder or a mortar or concrete composition including said slag-based binder, which is more acceptable than OPC-based compositions, with respect to the sanitary and safety issues.
— O5—Providing a slag based binder or a mortar or concrete composition including said slag based binder, which gives rise to dry or semi-dry precast concrete formulations with appropriate ability to be manufactured by vibro-compaction.
— O6—Providing a slag-based binder or a mortar or concrete composition including said slag-based binder, which gives rise to wet formulations with appropriate rheological properties, i.e stable rheology (good workability) during a the usual setting time (e.g. from some minutes to several hours) required by the users of said wet formulation, without increasing the W/B ratio and jeopardizing the mechanical properties of the hardened material obtained from this wet formulation.
— O7—Providing a slag-based binder or a mortar or concrete composition including said slag-based binder, which gives rise to a hardened material with required mechanical properties, especially an acceptable early strength (for instance 24 hours).
— O8—Providing a slag-based binder or a mortar or concrete composition including said slag-based binder, which gives rise to a hardened material with required durability.
— O9—Providing a slag-based binder or a mortar or concrete composition including said GGBS-based binder, which gives rise to a hardened material with the usually required setting time (e.g. from some minutes to several hours).
— O10—Providing a slag-based binder or a mortar or concrete composition including said GGBS-based binder, which gives rise to a hardened product with an acceptable ratio W/B e.g. lower than or equal to 1.0, preferably 0.7, and more preferably 0.4 or 0.35 or 0.30.
— O11—Providing a simple and cheap method of preparation of the slag-based binder or the mortar or concrete composition including said slag-based binder, which complies with at least one of the objectives —O1— to —O10—.
— O12—Providing a simple and cheap method of preparation of a wet form of the slag-based binder or a mortar or concrete composition including said slag-based binder.
— O13—Providing hardened products for the building industry including slag as at least partial binder.

SUMMARY OF THE INVENTION

It follows that the invention pertains to a slag-based binder comprising:
A. at least one slag;
A'. optionally at least one $CO_3$-containing mineral powder;
B. optionally at least one co-binder different from binder A. and from $CO_3$ powder A' if present;
C. at least one activator of the water/slag reaction;
C'. optionally at least one co-activator C', different from C;
D. at least one chelatant and/or at least one source of chelatant, said chelatant being preferably a scale inhibitor;
E. and, optionally, at least one superplasticizer different from the chelatant D.

It is to the credit of the inventors to have discovered the benefits of the component D. in combination with the other components A & C and optionally A' and/or B and/or C' and/or E, with respect to the objectives —O1— to —O12—, and notably to the workability, to the reduction in initial water demand and to the increase in final strength of the hardened concrete/mortar. Additionally, the new composition counteracts initial slow strength development associated with neutral and acid slag cement at ambient temperature hardening.

This slag-based binder makes it possible to control the final hardened material properties, including mechanical strength and durability. In particular the hardened material is not or few subject to shrinkage and presents a good freeze-thaw and a good chemical resistance. This slag-based binder has also, which is not the least, a limited environmental impact.

In another aspect, the invention relates to a kit comprising at least a part of the components of the binder according to the invention and instructions for the preparation of a wet formulation comprising said binder, at least one aggregate and water in a quantity such that the ratio Water/Binder be in the following ranges in an increasing order of preference:

$$0.1 \leq W/B \leq 1; 0.2 \leq W/B \leq 0.5; 0.25 \leq W/B \leq 0.4.$$

In another aspect, the invention concerns a dry composition, for instance a concrete or a mortar, comprising the binder according to the invention and at least one aggregate.

According to variants of the invention, the slag-based binder composition and/or the dry composition [slag-based binder/aggregate] can also incorporate at least one ingredient, preferably at least one functional additive.

In another aspect, the invention concerns a wet formulation comprising the binder according to the invention, at least one aggregate and water in a quantity such that the ratio Water/Binder be in the following ranges in an increasing order of preference:

$$0.1 \leq W/B \leq 1; 0.2 \leq W/B \leq 0.5; 0.25 \leq W/B \leq 0.4$$

In another aspect, the invention pertains to a method for the preparation of the wet formulation according to the invention comprising mixing of the binder, the aggregate and the water in a quantity such that the ratio Water/Binder be in the following ranges in an increasing order of preference:

$$0.1 \leq W/B \leq 0.5; 0.2 \leq W/B \leq 0.5; 0.25 \leq W/B \leq 0.4;$$

A part of the binder and at least a part of the water being preferably mixed together prior to the mixing with the aggregate.

In another aspect, the invention concerns a method of manufacturing buildings or civil engineering works or elements thereof, coatings, fillers, screeds, tiles adhesives and/or internal or external insulation systems, from the wet formulation according to the invention, which hardens as exposed to the air or under water.

Definitions

According to the terminology of this text, the following non limitative definitions have to be taken into consideration:
- every singular designates a plural and reciprocally,
- "slag" denotes a stony waste matter separated from metals during the smelting or refining of ore.
- "GGBS" or "GGBFS": Ground Granulated Blast Furnace Slag, which is equivalent to blast furnace slag, Granulated Blast Furnace Slag (GBFS), blast furnace water-crushed slag powder and blast furnace slag fine aggregate.
- "cement" is understood as meaning a powdery substance made for use in making mortar or concrete. It is a mineral binder, possibly free from any organic compound. It includes slag portland blended and geopolymer-based cements
- "binder" refers to any material or substance that holds or draws other materials together to form a cohesive whole mechanically, chemically, or as an adhesive.
- "mortar" refers to a material composed of binder(s) and aggregates such as sand.
- "concrete" refers to a material composed of binder(s) and aggregates such as sand and (fine) gravel.
- the term "non-aqueous" is understood as meaning a substance in a solid form, which is not dissolved or dispersed in an aqueous solution. The solid form may contain constitution water molecules included in the crystalline network. The solid form may also include a powder, flakes, granules or the like.
- "mixing" is understood as any form of mixing and may include milling or grinding of substances in solid form.
- "D50" gives the median size of the granulometric distribution of material's particles (usually in micrometres for cementation materials). It means that 50% of the particles have a size less than the specified number or 50% of the particles have the size greater than the given number. The measurement of D50 is done by Laser diffraction analysis, also known as Laser diffraction spectroscopy, by means of a Laser diffraction analyzer named "Mastersizer 3000" and commercialized by the MALVERN company, with the humid way method.
- "Dry weight"—weight of material in its natural state (without adding of water or another solutions from outside).
- "in-situ LDH formation" means production of LDH, for instance by precipitation, after mixing of the binder with water.
- "different" in the expressions "B different from A" or "C' different from C" refers notably to at least one chemical and/or and at least one physical difference.

BRIEF DESCRIPTION OF THE DRAWINGS

FIG. 12, 13, 14, 15, 24A and 24B are graphics represented the yield stress versus

DETAILED DESCRIPTION OF THE INVENTION

Figure 1:
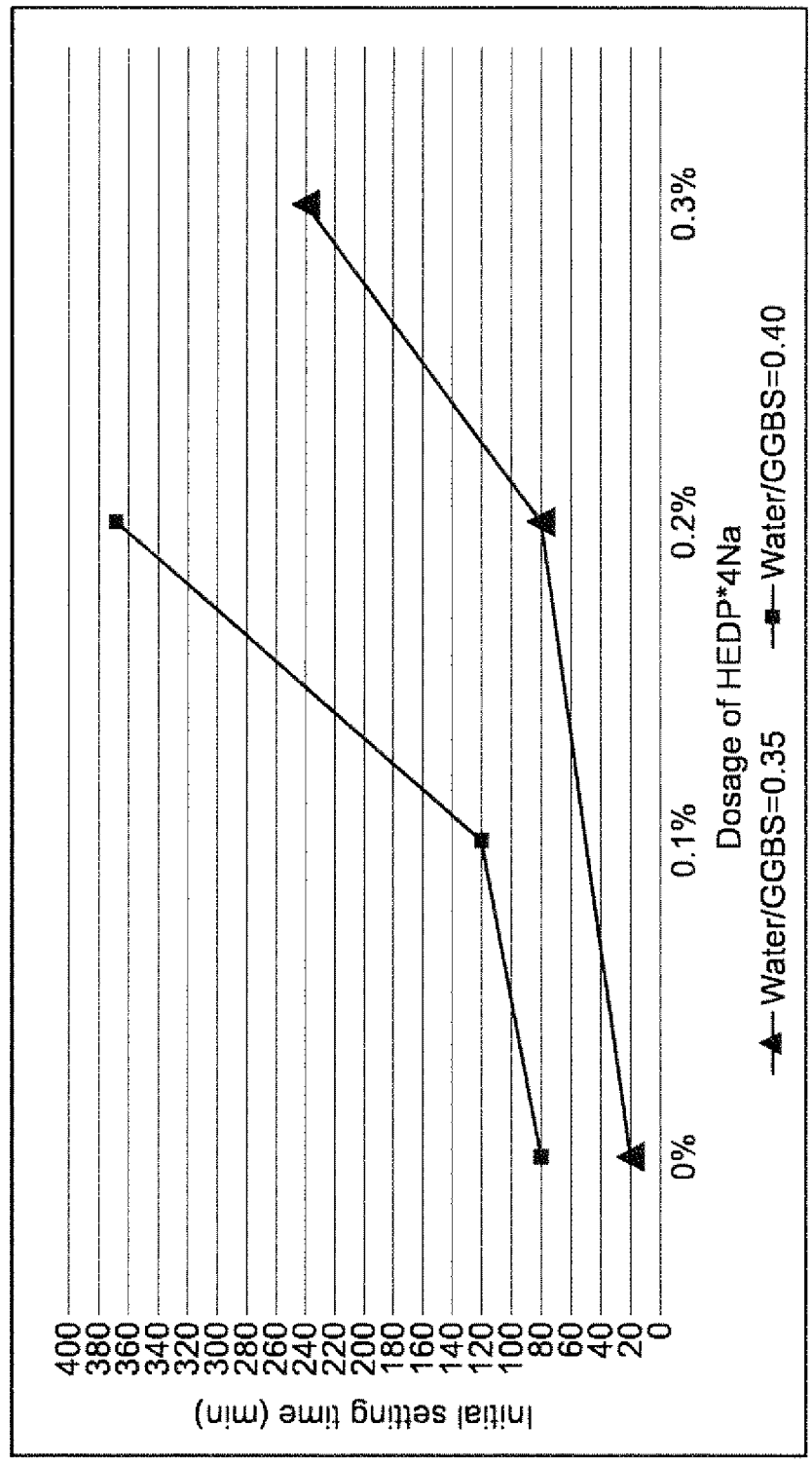
FIGS. 1 and 2 are graphics representing an initial setting time versus a dosage of chelatant.

The Binder
A. Slag
The slag A is preferably a GGBS.
GGBS is a glassy granular material obtained by quenching molten slag from a blast furnace in water, and then by finely grinding the quenched product to improve GGBS reactivity. GGBS is an amorphous alumino-silicate glass, essentially composed of $SiO_2$, CaO, MgO, and $Al_2O_3$. A number of glass network cation modifiers are present: Ca, Na, Mn, etc.
GGBS is preferably manufactured according to the European standard [NF EN 15167-1].
According to a noteworthy feature of the invention, the slag A is a powder or a slurry preferably obtained as co-product(s) from different industries, or obtained in its natural state, or obtained by synthesis. Its chemical composition is:

| CaO | $SiO_2$ | $Al_2O_3$ | $Fe_2O_3$ | $TiO_2$ | MgO | $SO_3$ | $Na_2O$ | $K_2O$ |
|---|---|---|---|---|---|---|---|---|
| [30.0-50.0] | [30.0-50.0] | [5.0-18.0] | [0.1-1.5] | [0.1-3.0] | [1.0-15.0] | [0.5-3.0] | [0.01-2-0] | [0.01-1.0] |

The figures in this table are % dry w/w with respect to A.
In a preferred embodiment of the invention, the slag A is a powder preferably selected among the following granulometric classes:
a1) which D50 is comprised is in the range]7.0-20.0 μm],]7.0-60 μm] or]7.0-100.0 μm]; [for instance a standard GGBS];
a2) which D50 is comprised is in the range]3.0-7.0 μm]; [for instance a fine GGBS];
a3) which D50 is comprised is in the range]0.5-3.0 μm], preferably[1.0-2.0 μm] or [0.5-2.0 μm]; [for instance an ultra-fine GGBS]
a4) and mixes thereof.

In another embodiment, the slag A powder comprises (in % dry w/w with respect to A):
- α1. 100 of class a1) A powder, or
- α2. between 99 and 50, preferably between 99 and 60, of class a1) A powder, and between 1 and 50, preferably between 1 and 40, of class a2) A powder, or
- α3. between 1 and 40, preferably between 1 and 30, of class a3) A powder.

The slag A can be also defined through its Blaine fineness. Slag A has a Blaine fineness (Bf) (ASTM C 204 Blaine fineness) given hereafter in cm²/g and according to an increased order of preference:

500≤Bf≤20000;
1000≤Bf≤10000;
2000≤Bf≤8000;
3000≤Bf≤7000;
3500≤Bf≤6000;

According to a particular variant of the invention, Slag A comprises 70 to 99.1% w/w, preferably 80 to 99.1% w/w of particles which Bf is such: 2500≤Bf≤8000; preferably 3500≤Bf≤7000; and 30 to 0.1% w/w, preferably 20 to 0.1% w/w which Bf is such: 8000≤Bf≤16000; preferably 10000≤Bf≤14000.

It should be emphasized that slag, e.g. GGBS, is a hydraulic binder (in contrast with fly-ash or silica fume for example). This means that slag alone reacts with water.

A'. CO3-Containing Mineral A'

The $CO_3$-containing mineral A' is preferably chosen in the group comprising—ideally composed of—limestone, dolomite, precipitated $CaCO_3$, chalk, marble, aragonite, travertine, tufa and their mixes.

In an advantageous embodiment, the $CO_3$-containing mineral A', is a powder or a slurry preferably obtained as co-product(s) from different industries, or obtained in it's natural state, or obtained by synthesis, selected among the following granulometric classes:
- a'1) which D50 is comprised in the range]250 µm-40 mm];
- a'2) which D50 is comprised in the range]16.0-250.0] µm
- a'3) which D50 is comprised in the range]6.0-16.0] µm;
- a'4) which D50 is comprised in the range]3.0-6.0] µm;
- a'5) which D50 is comprised in the range]0.9-3.0] µm, preferably [1.0-2.0] µm;
- a'6) which D50 is comprised in the range]0.02-0.9] µm;
- a'7) and mixes thereof.

For instance, $CO_3$-containing mineral A' is a crystalline solid or an ionic solid.

In a possibility, the $CO_3$-containing mineral A' powder comprises (in % dry w/w with respect to A'):
- αα1. 100 of class a'1) A' powder; or
- αα2. 100 of class a'3) A' powder; or
- αα3. between 90 and 10, preferably between 80 and 30, of class a'1) A' powder, and between 10 and 90, preferably between 20 and 70, of class a'2) A' powder; or
- αα4. between 1 and 40, preferably between 10 and 30, of class a'3) A' powder; or
- αα5. between 1 and 20, preferably between 5 and 15, of class a'3) A' powder, and between 99 and 80, preferably between 95 and 85, of class a'5) A' powder.

Examples of a'1) to a'6) D50 are respectively as follows: 10 mm+/−5; 100+/−10 µm; 10+/−1 µm; 4.5+/−1 µm; 1.5+/−0.1 µm; 0.5+/−0.01 µm.

Regarding the granulometric class a'6) of A' powder, Precipitated Calcium Carbonate (designated as PCC) is an interesting example of $CO_3$-containing mineral belonging to a'6). PCC is a precipitated powder of very pure calcium carbonate limestone (99.0+/−1%). The PCC particles are nano-sized. Examples of PCC D50 are as follows: 0.05+/−0.01 µm; 0.08+/−0.01 µm.

The specific surface is another parameter which can drive the selection of the $CO_3$-containing mineral A' powder according to the invention.

Advantageously, BET of $CO_3$-containing mineral A' can be from 1 to 60 m²/g, for instance equal to 25+/−5 m²/g and/or to 8+/−5 m²/g.

B. Co-Binder

Slag A is preferably used with a co-binder B.

According to the invention, the binder thus comprises at one least one hydraulic co-binder different from slag A and possibly different from $CO_3$-containing mineral A' when A' is present.

According to one embodiment $E^{b1}$, said co-binder B preferably includes at least one compound chosen among slaked/quick lime, hydrated lime, supersulfated cements, calcium aluminate cements, calcium sulfoaluminate cements, Portland cements, Portland ground clinkers, (classes F and/or C) fly ashes, pozzolanic binders, (classes F and/or C) natural & synthetic pozzolans, silica fumes, rice husk ashes, paper sludge ashes, bottom ashes, incinerated bottom ashes, recycled glasses, steel slags, stainless steel slag, phosphorous slags, copper slags, ladle slags, red muds, cement kiln dusts, biomass ashes, and mixes thereof.

Co-binder is, for instance, an OPC binder (OPC: Ordinary Portland Cement notably CEM I, II, III, IV, and V), such as CEM I.

According to another embodiment $E^{b2}$, at least one co-binder B, different from slag A, is present, said co-binder B comprising at least one Layered Double Hydroxide (LDH) and/or at least one precursor for in-situ LDH formation.

The LDH are ionic solid materials which layered structure comprises [hydroxide layer/metal cations layer/hydroxide layer/anions-neutral molecules layer/hydroxide layer/metal cations layer/hydroxide layer].

The metal cations are e.g. trivalent cations, such as $Al^{3+}$, $Fe^{3+}$ ... and divalent cations, like $Ca^{2+}$, $Mg^{2+}$, $Mn^{2+}$, $Fe^{2+}$, $Co^{2+}$, $Ni^{2+}$, $Cu^{2+}$ or $Zn^{2+}$ ....

The LDH of the co-binder can be a single LDH or a mixture of different LDHs. According to another upcoming features of the invention the LDH(s), is characterized by the general formula (I):

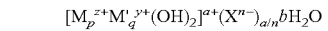
$$[M_p^{z+}M'^{y+}_q(OH)_2]^{a+}(X^{n-})_{a/n}bH_2O$$

wherein $M_p^{z+}$ $M'^{y+}_q$ are metal cations or mixtures of metal cations; z=1 or 2; y=3 or 4;

p+q=1; b=0 to 10; $X^{n-}$ is an anion, and n is 1 to 5 and a is determined by p, q, y, and z such that a=zp+yq−2;

M is preferably selected in the group comprising ideally composed of—Mn, Li, Mg, Zn, Fe, Ni, Co, Cu, Ca, or a mixture of two or more thereof.

y is preferably 3 and M' is preferably selected in the group comprising—ideally composed of —Cr, Mn, Co, V, Sc, Al, Ga, Fe, or a mixture thereof; preferably in the sub-group comprising—ideally composed of—Al, Ga, Fe or mixtures thereof; Al being the most preferable elemental M';

M/M' being selected in very preferable embodiment from Zn/Al, Ni/Al, Mg/Al, and/or Ca/Al.

Advantageously, the anion A is selected from halide, inorganic oxyanion, anionic surfactants, anionic chromophores, and/or anionic UV absorbers.

Particularly, this inorganic oxyanion can be carbonate, bicarbonate, hydrogenphosphate, dihydrogeno-phosphate, nitrite, borate, nitrate, sulfate, sulphite or phosphate or a mixture of two or more thereof.

For instance, the inorganic oxyanion is preferably a nitrate, a carbonate, a chloride and/or a sulfate.

According to a remarkable feature of the invention, the LDH is in a particulate form and the particles have a size of not greater than 10.000 nm, preferably not greater than 2000 nm, more preferably not greater than 300 nm, and even more preferably not greater than 100 nm.

The LDH particle size ranges can be from 50 to 350 nm in diameter, for instance from 200 to 300 nm (as measured using transmission electron microscope). For example, LDH is $[Ca_2Al(OH)_6](NO_3).bH_2O$ or $[Ca_2Al(OH)](SO_4)_{0.5}.bH_2O$.

In adequate conditions, for example in a pH greater than or equal to 10, e.g. between 10 and (14), at a temperature for instance between 0 and 90° C., e.g. the ambient temperature and at a pressure for instance between 0.1 Atm and 5 Atm, e.g. the ambient pressure, the LDH can be formed from one or several precursors, in situ, i.e. as soon as water is mixed with the slag binder according to the invention, before the setting.

According to a particular feature of the invention, the LDH precursor is selected in the group comprising—ideally composed of—
  i. Ordinary Portland cement (OPC) ground clinker mineral;
  ii. OPC;
  ii. Slag powder which D50 is in the range]1.0-5.0] μm;
  iv. Alumina source;
  v. Ferric source;
  vi. Magnesium source;
  vii. Calcium source;
  viii. Lithium source;
  ix. Zinc source;
  x. Manganese source;
  xi. Copper source;
  xii. Minerals belonging to the hydrotalcite supergroup;
  xiii. Mixtures thereof.

(i) The OPC ground clinker is made by heating a homogeneous mixture of raw materials in a rotary kiln at high temperature. The products of the chemical reaction aggregate together at their sintering temperature, about 1300-1450° C. The major raw material for the clinker-making is usually limestone mixed with a second material containing clay as source of alumino-silicate. Some of the second raw materials used are: clay, shale, sand, iron ore, bauxite, fly ash and slag.

In a noteworthy feature of the invention, the OPC ground clinker Portland cement (i) can be as follows:

| CaO | $SiO_2$ | $Al_2O_3$ | $Fe_2O_3$ | $TiO_2$ | MgO | $Na_2O$ | $K_2O$ |
|---|---|---|---|---|---|---|---|
| [45.0-75.0] | [15.0-35.0] | [0.1-12.0] | [0.5-5.0] | [0.01-2.0] | [0.01-4.0] | [0.01-1.5] | [0.01-1.5] |

The OPC ground clinker Portland cement (i) is advantageously characterised by a Blaine fineness (ASTM C 204 Blaine fineness) (Bf) given hereafter in cm²/g and according to an increased order of preference:
  500≤Bf≤10.000;
  1000≤Bf≤9.000;
  2000≤B≤8.000.

According to a particular variant of the invention, the OPC ground clinker Portland cement (i) has a (Bf) given hereafter in cm²/g: 2000≤Bf≤3.000;

According to a particular variant of the invention, the OPC ground clinker Portland cement (i) has a (Bf) given hereafter in cm²/g: 3000<Bf≤4.500;

According to a particular variant of the invention, the OPC ground clinker Portland cement (i) has a (Bf) given hereafter in cm²/g: 5.500≤Bf≤6.500.

(ii) The OPC used as precursor of LDH can be CEM I, II, III, IV, and V), such as CEM I.

The OPC (ii) is advantageously characterised by a Blaine fineness (ASTM C 204 Blaine fineness) (Bf) given hereafter in cm²/g and according to an increased order of preference:
  500≤Bf≤10.000;
  1,000≤Bf≤9,000;
  2,000≤Bf≤8,000.

According to a particular variant of the invention, the OPC (ii) has a (Bf) given hereafter in cm²/g: 2,000≤Bf≤3,000;

According to a particular variant of the invention, the OPC ground clinker Portland cement (i) has a (Bf) given hereafter in cm²/g: 3,000<Bf≤4,500;

According to a particular variant of the invention, the OPC ground clinker Portland cement (i) has a (Bf) given hereafter in cm²/g: 5,500≤Bf≤6,500.

(iii) Slag powder which D50 in the range]1.0-5.0] μm, can be the ones as above defined.

(iv) The alumina source can be:
aluminate salts, notably sulfates, chlorides, nitrates; alums;
aluminum oxide, aluminum hydroxide, sodium aluminates, potassium aluminates
calcium aluminate cements; calcium sulphoaluminate cements, tricalcium aluminate, tricalcium aluminoferrite;
alumino-silicate clay minerals notably those of kaolinites group;
minerals containing alumina like bauxite;
all forms thereof notably forms with different water amounts, calcined forms, non-calcined forms, dry forms, slurry forms and mixes of thereof;
mixtures thereof.

As examples of sodium aluminates, one can quote $NaAlO_2$, $NaAl(OH)_4$, $Na_2O.Al_2O_3$, $Na_2Al_2O_4$, $Na_5AlO_4$, $Na_{17}Al_5O_{16}$, $Na_7Al_3O_8$, $NaAl_{11}O_{17}$ inorganic salts; mixes of sodium hydroxide (NaOH) with source of Alumina ($Al_2O_3$) and mixtures thereof.

(vi). Here are examples of Mg sources: magnesium acetate, magnesium bromate, magnesium bromide, magnesium chlorate, magnesium chlorite, magnesium chromate, magnesium fluorosilicate, magnesium formate, magnesium iodade, iodite, magnesium molybdate, magnesium nitrate, magnesium perchlorate, magnesium sulfate, magnesium thiosulfate;

(vii) Here are examples of Ca sources: Calcium aluminate cement, calcium sulfoaluminate cement, calcium carbonate, calcium sulfate, calcium chloride, calcium bromide, calcium fluoride, calcium oxide, calcium hydroxide, calcium hydride, calcium iodide, calcium oxalate, calcium nitrate, calcium nitrite, calcium perchlorate, calcium phosphate, calcium pyrophosphate, calcium thiocyanate, calcium formate, hydroxyapatite of calcium, calcium permanganate, calcium acetate, calcium azide, calcium bicarbonate, calcium chlorate, etc.

(viii) Here are examples of Li sources: lithium hydroxide, lithium carbonate, lithium nitrite, lithium nitrate, lithium perchlorate, lithium permanganate, lithium selenide, lithium selenite, lithium sulfate, lithium (III) sulfate, lithium tartrate, lithium thiocyanate, lithium formate, Lithium fluorosilicate, Lithium acetate, Lithium azide, Lithium benzoate, Lithium bromate, Lithium bromide, Lithium chlorate, Lithium chromate, Lithium dichromate, Lithium dihydrogen phosphate, lithium iodide, lithium molibdate;

(xi) Minerals belonging to the hydrotalcite supergroup. The hydrotalcite supergroup, also named the Mg—Al carbonate hydrotalcite group, is the longest-known example of a natural LDH phase. It comprises
the hydrotalcite group,
the quintinite group,
the fougerite group of natural 'green rust' phases,
the woodwardite group,
the cualstibite group,
the glaucocerinite group,
the wermlandite group, and
the hydrocalumite group.

According to a possibility of the invention, these minerals (v) belonging to the hydrotalcite supergroup are calcinated. For instance, the thermal treatment consists in heating the hydrotalcite up to a temperature of e.g. 500° C.

The incorporation of the LDH into the composition of slag binder according to the invention, can be made under dry form (powder) or under wet form (solution, slurry).

Whatever be the form of the precursor (dry or wet) for the incorporation in the slag binder composition according to the invention, it is interesting to comply with the following quantitative conditions:

The co-binder B concentration—in % dry w/w with respect to A, to A&A', to A&B or to A&A'&B-, is in the following ranges in an increasing order of preference: [0-50]; [0-20]; [0-15]; [0.1-7].

As far as the precursors (i) [Ordinary Portland cement (OPC) ground clinker mineral] and (ii) [OPC] are concerned, the preferred concentration ranges are—in % dry w/w with respect to A, to A&A', to A&B or to A&A'&B-: [0-30]; [0-15]; [0.1-10].

Thanks to this advantageous embodiment $E^{b2}$, the slag binder according to the invention makes it possible to obtain an early strength (at least 0.5 Mpa) of 1 to 3 days, with a setting time comprised between 5 min and 12 hours (rheology compatible with a correct processability) at different curing conditions. Needless to say that these are well appreciated result.

C. Activator

It should be emphasized that slag A is a hydraulic binder (in contrast with fly-ash or silica fume for example). This means that slag alone reacts with water. Addition of a chemical activator (or heating) is advantageous to speed up this reaction. The role of the activator C is generally to increase pH to an appropriate level in order to enhance nucleophilic attack of the glass network by the hydroxyl ions.

The activator promotes the setting and/or the curing and/or the hardening of the binder, the mortar/concrete composition The activator can be in the solid form, hydrated or anhydrous, e.g. in the form of a powder or in the solid form, e.g. solution or suspension.

All or part of the activator can be incorporated into the water used to be mixed with the composition comprising the binder(s).

The activator is preferably incorporated under powdery form in the dry composition, before its mixing with water, so that a so-called ready-mix mortar/concrete composition is produced.

The dry activator can be mixed with the binders and/or aggregates/fillers.

Alternatively, an aqueous, preferably alkaline activating solution can be added to the other pulverulent components. In this case, the term two-component binder is used.

According to an interesting embodiment of the invention, the activator C is chosen among
the alkali metal carbonates, the alkali metal silicates, the alkali metal hydroxides, the alkali metal sulfates, and mixes thereof; the alkali metal being preferably Li, Na, K;
the mineral wastes, containing at least one alkali metal carbonates and/or soda and/or potash, and/or alkali metal silicates and/or alkali metal sulfates and/or lime;
said mineral wastes being preferably chosen among the mineral wastes from the group comprising—ideally composed of—coal gangue mine tailings, iron ore mine tailings, copper mine tailings, tungsten mine tailings, chromite ore mine tailings, vanadium mine tailings, red muds, incinerator bottom ashes, coffee wastes, incinerator products of waste paper sludges, incinerator products of sludges resulting from water treatment, rock mineral wools, glass mineral wools, fluid catalytic crackings, rice husk bark ashes, palm oil fuel ashes silico-manganese slags, ceramic red clay bricks, ceramic porcelain stonewares, and mixes thereof;
phosphoric acid;
and mixes thereof;
the alkali metal carbonates being preferred, and particularly $Na_2CO_3$ or $K_2CO_3$.

According to a noteworthy feature of the invention, the concentration of the activator C—in % dry w/w with respect to A, to A&A', to A&B or to A&A'&B-, being preferably in the following ranges in an increasing order of preference: [0.1-30.0]; [1.0-16.0]; [4.0-12.0].

According to an example, the GGBS based binder composition can comprise as B component: Fly ash 55% w/w or B: 30% w/w fly ash, 20% w/w OPC and 5% w/w as LDH precursor (Al source and Mg source), the remaining being A: GGBS and C.

C'. Co-Activator

In a particular embodiment, the activator C is combined with at least one co-activator C', different from C, selected in the group comprising soluble salts of chlorides and/or of fluorides and/or sulfates, their hydrates, their anhydrous forms and mixes thereof-preferably consisting of—NaCl; $CaCl_2$, NaF, $Na_2SiF_6$, KCl, $Na_2SO_4$, $K_2SO_4$, $CaSO_4$, their hydrates, their anhydrous forms, and mixes thereof.

These preferred activators and co-activators C & C' can speed up or slow down the reaction of the system AA', AB or AA'B, as well as modify the properties of the system AA', AB or AA'B Advantageously, the concentration of the co-activator C'—in % dry w/w with respect to A, to A&A', to A&B or to A&A'&B-, being preferably in the following ranges in an increasing order of preference: [0.001-30.0]; [0.01-16.0]; [0.05-10].

D. Chelatant

In a preferred embodiment, the chelatant D is a scale inhibitor, preferably a calcium scale growth inhibitor of precipitated calcium-containing ou aluminium-containing phases (e.g. calcium carbonate, gaylussite, C-S-H°, C-A-S-H) and, more preferably a compound chosen among:

the phosphonates, preferably the monophosphonates and/or the diphosphonates;

the phosphates, preferably the tripolyphosphates and/or the hexametaphosphates;

the carboxylates, preferably the polyacrylates, the citrates, the tartrates and/or the gluconates;

the amines;

their derivatives, their salts;

and mixes thereof;

and even more preferably a compound chosen among PBTC (phosphonobutane-1,2,4-tricarboxylic acid), ATMP (aminotrimethylene phosphonic acid), HEDP (1-hydroxyethylidene-1,1-diphosphonic acid), DTPA (diethylenetriaminopenta-acetic acid), DCTA (diaminocyclohexanetetra-acetic acid), PAA (polyacrylic acid), PPCA (phosphino-polyacrylates), PMA (polymaleic acids), MAT (maleic acid terpolymers), SPOCA (sulfonated phosphonocarboxylic acid), PPCA (Poly-Phosphono Carboxylic acid), EDTMP (ethylenediamine-tris[methylene phosphonic acid]) and DTPMP (Diethylenetriamine-penta[methylene phosphonic acid]), theirs derivatives, their salts and mixes of these compounds.

In a possibility, the chelatant D is selected in the group comprising—preferably consisting of—compounds of formulae:

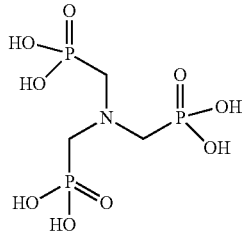
(D.1)

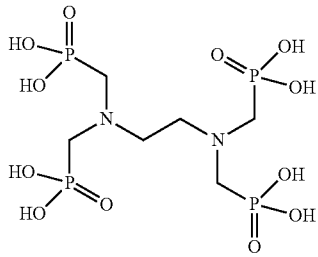
(D.2)

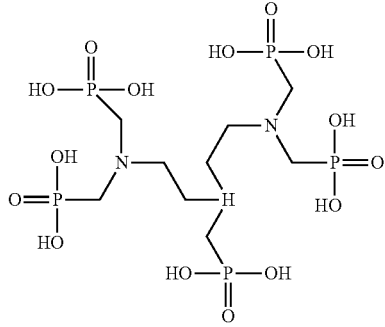
(D.3)

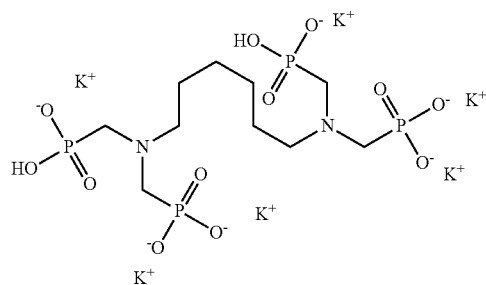
(D.4)

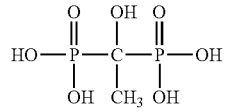
(D.5)

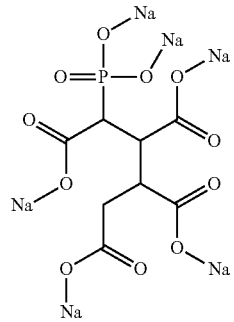
(D.6)

(D.7)

salts or acid forms thereof and mixes thereof; (D.5) being particularly preferred.

According to the invention, D is advantageously a Ca and/or an Al chelatant.

It is also preferable that the stability constant with Ca++ of the chelatant D be lower than or equal to, in an increasing order of preference 10, 5, 0, and ideally comprised between −10 and −1.

According to another outstanding feature of the invention, the chelatant D is capable to adsorb itself onto the reactive solid part of the binder during the mixing which takes place during the curing. It is preferably an adsorption through electrostatic attraction, the solid part being for instance negatively charged (oxides) whereas the chelatant D is neutral and/or positively charged.

The concentration of the chelatant D—in % dry w/w with respect to slag A—is advantageously selected in the following ranges in an increasing order of preference:

[0.001-2.0]; [0.01-0.1]; [0.01-0.5].

E. Superplasticizer

When the binder according to the invention contains at least one superplasticizer E, this latter is preferably a compound chosen among the following compounds: NBSP (naphthalene based superplasticizers), PNS (polynaphthalene sulphonates), MBSP (melamine based superplasticizers), PMS (polymelamine sulphonates), HCA (hydroxycarboxylic acids), (P)AA [(poly)acrylic acids], LS (lignosulfonates)—particularly ammonium, calcium or sodium lignosulfonates—, PCE (polycarboxylic ethers), phosphonates, the salts and/or the derivatives of these compounds and mixes of these compounds; the MSSP, PMS, NBSP, PNS & PCE being particularly preferred.

The privileged concentration of the superplasticizer E.—in % dry w/w with respect to slag is in the following ranges in an increasing order of preference:
[0.01-10.0]; [0.05-5.0]; [0.05-2.0].

F. Other Components

The binder is advantageously enriched with one or several other components which are ingredients, notably functional additives preferably selected in the following list:

F.1. Activator(s) different from C & C',

F.2. Water retentive agent.

A water retentive agent has the property to keep the water of mixing before the setting. The water is so trapped in the wet formulation paste which improves its bond. To some extent, the water is less absorbed by the support. Salting out on the surface is limited and evaporation is reduced.

The water retentive agent is preferably chosen in the group comprising: modified celluloses, modified guars, modified cellulose ethers and/or guar ether and their mixes, more preferably consisting of: methylcelluloses, methylhydroxypropylcelluloses, methylhydroxyethyl-celluloses and their mixes.

F.3. Rheological agent different from F.2

The possible rheological agent (also named a "thickener") is preferably chosen in the group comprising, more preferably consisting of: clays, starch ethers, cellulose ethers and/or gums (e.g. Welan guar xanthane, succinoglycans), modified polysaccharides—preferably among modified starch ethers—, polyvinylic alcohols, polyacrylamides, clays, sepiolites, bentonites, and their mixes, and more preferably chosen in the group of clays, bentonite, montmorillonite.

F.4. Defoamer/Antifoams

The possible defoamer is preferably chosen in the group comprising, more preferably consisting of: polyether polyols and mixes thereof.

F.5. Biocide

The possible biocide is preferably chosen in the group comprising, more preferably consisting of: mineral oxides like zinc oxide and mixes thereof.

F.6. Pigment

The possible pigment is preferably chosen in the group comprising, more preferably consisting of: $TiO_2$, iron oxide and mixes thereof.

F.7. Flame Retardant

The possible flame retardant (or flame proof agent), which makes it possible to increase the fire resistance and/or to shrink the speed of flame spreading of the composition is preferably chosen in the group comprising, more preferably consisting of:

minerals preferably aluminium hydroxide [$Al(OH)_3$, ATH], magnesium hydroxide MDH, hydromagnesite, hydrates, red phosphorus, and boron compounds, preferably borates, organohalogen compounds, preferably organochlorines and more preferably such as chlorendic acid derivatives and chlorinated paraffins; organobromines such as decabromodiphenyl ether (decaBDE), decabromodiphenyl ethane, polymeric brominated compounds preferably brominated polystyrenes, brominated carbonate oligomers (BCO's), brominated epoxy oligomers (BEO's), tetrabromophthalic anyhydride, Tetrabromobisphenol A (TBBPA) and hexabromocyclododecane (HBCD).

antimony preferably pentoxide and sodium antimonite organophosphorus compounds preferably organophosphate, TPP, RDP, BPADP, tri-o-cresyl phosphate, phosphonates preferably DMMP and phosphinates.

chlorophosphates like TMCP and TDCP.

F.8. Air-Entraining Agents

Air-entraining agents (surfactants) are advantageously chosen in the group comprising—ideally consisting in—natural resins, sulfated or sulfonated compounds, synthetic detergents, organic fatty acids and their mixes, preferably in the group comprising—ideally consisting in—the lignosulfonates, the basic soaps of fatty acids and their mixes, and, more preferably in the group comprising—ideally consisting in—the sulfonate olefins, the sodium lauryl sulfate de sodium and their mixes.

F.9. Retarders

Retarders (tartric acid and its salts: sodium or potassium salts, citric acid and its salts: sodium (trisodic citrate) and their mixes;

F.10. Plasticizers

F.11. Fibres

F.12. Dispersion powders

F.13. Wetting agents

F.14. Polymeric resins

F.15. Complexing agents different from D and

F.16. Aqueous dispersions.

F.17. Drying shrinkage reducing agents based on polyols,

Additives' concentrations in the binder, can be from 0.001% to 10% by weight of the total weight of the composition, in particular binder composition In an outstanding embodiment of the invention, the base binder composition comprises:

A. GGBS (different granular size distributions);

A'. Limestone as $CO_3$-containing mineral powder (different granular size distributions/reactivity);

B. OPC or its clinker, or lime, and mixes thereof;

C. activator such as sodium carbonate (e.g. around 6 to 10% on GGBS);

D. Ethylene diamine tris-methylene phosphonic acid salt (EDTMP) and/or Hydroxyethylidene Diphosphonic acid salt (HEDP), and E. superplasticizer such (less than 1%).

The slag-based binder or a mortar or concrete composition including said slag-based binder, presents the advantages above mentioned in —O1- to —O10-.

Regarding —O5-, the according to the invention slag based binder or the according to the invention mortar or concrete composition including said slag based binder, makes it possible to produce dry or semi-dry precast concrete formulations with appropriate ability to be manufactured by vibro-compaction.

Hence, the present invention also concerns:

dry or semi-dry precast concrete formulations comprising the according to the invention slag based binder or the according to the invention mortar or concrete composition including said slag based binder;

a process for manufacturing said dry or semi-dry precast concrete formulations, notably by vibro-compaction.

Kit to Make the Binder

This is a conditioning set comprising all or part of the components of the binder, as well as instructions for the preparation of a wet formulation comprising the binder according to the invention, at least one aggregate and water in a quantity such that the ratio Water/Binder be in the following ranges in an increasing order of preference:

$0.1 \leq W/B \leq 1; 0.2 \leq W/B \leq 0.55; 0.2 \leq W/B \leq 0.5$.

Dry Compositions Binder/Aggregates

In other words, the dry compositions are for instance concretes or mortars comprising the binder according to the invention as herein defined and at least one aggregate, notably: sands and/or gravels, and/or fillers at different particle size distributions.

Aggregates/Fillers

Aggregates comprise a large category of particulate material used in construction, including sands, gravels, crushed stones, slag (non-ground), recycled concrete and geosynthetic aggregates. They serve as reinforcement to add strength to the overall composite material.

The mortar/concrete composition can also include:

fillers such as flours, for example based on quartz, limestone, barite or clays and mixtures thereof;

as well as light fillers, such as perlites, kieselguhr (diatomaceous earth), expanded mica (vermiculite) and foamed sand, and mixtures thereof.

The quantity of the aggregates/fillers in the mortar or concrete composition can suitably be (in % by weight) between 0 and 97, preferably between 20 and 80, and more preferably between 50 and 70, based on the total weight of the mortar or concrete composition and depending on the application.

Advantageously, said dry compositions (e.g. concretes or mortars) also include, apart from aggregates, one or several ingredients, especially functional adjuvants, which can be the same as the additives F.1 to F.17, as above defined in the detailed description of the binder.

"Admixtures" concentrations in the dry compositions of e.g. concretes/mortars can be from 0.1% to 10% by weight of the total weight of the composition, in particular mortar or concrete composition Wet Formulations Binder/Aggregates The invention also pertains to a wet formulation comprising the binder according to the invention as herein defined, at least one aggregate and water in a quantity such that the ratio water/binder be in the following ranges in an increasing order of preference:

$$0.1 \leq W/B \leq 1; 0.2 \leq W/B \leq 0.55; 0.2 \leq W/B \leq 0.5.$$

Methods

The present invention also encompasses:

1. A simple and cheap method for the preparation of the wet formulation according to the invention as herein defined, comprising mixing of the binder, the aggregate and the water in a quantity such that the ratio Water/Binder be in the following ranges in an increasing order of preference:

$$0.15 \leq W/B \leq 0.5; 0.2 \leq W/B \leq 0.4; 0.25 \leq W/B \leq 0.35;$$

a part of the binder and at least a part of the water being preferably mixed together prior to the mixing with the aggregate.

2. A simple and cheap method of manufacturing buildings or civil engineering works or elements thereof, coatings, fillers, screeds, tiles adhesives and/or internal or external insulation systems, from the wet formulation according to the invention as herein defined, which hardens inter alia as exposed to the air.

Said method of manufacturing is characterised in that the wet formulation according to the invention as herein defined, is shaped or applied onto a support and is then submitted to a curing step at a temperature comprised between (in an increased order of preference), −5 and 95° C.; 20 and 65° C., 25 and 50° C., for 1 to 48 h, preferably for 5 to 36 h.

It is also possible that the curing step comprises increasing and decreasing cycles of temperatures, at relative humidity greater than or equal to 40%, preferably to 80%, and, more preferably equal to 100%; under a pressure comprised between 8-12 Atm or a pressure of 1 Atm. The so manufactured elements are e.g. paving blocks, concrete, mortars.

EXAMPLES

The granulometric data D10; D50; D90 used in the following examples, are measured by means of a laser analyser of the Malvern company named «MASTERSIZER 3000», following the humid way method.

Example 1: Setting Time

Materials:
1) As A—GGBS

It was provided by Fos-sur-Mer Ecocem factory. It is manufactured according to the European standard [NF EN 15167-1]. The granulometry is characterized by D10=1.38 µm; D50=12.16 m; D90=34.87 m. The granulometric data were determined using a laser granulometry analyser of the Malvern company named «MASTERSIZER 3000», following the wet dispersion method. The Blaine fineness is 4500 cm$^2$/g.

Chemical Composition:

| CaO | SiO2 | Al$_2$O3 | Fe$_2$O3 | TiO2 | MgO | Na$_2$O | K$_2$O |
|---|---|---|---|---|---|---|---|
| 43.9 | 37.6 | 10.26 | 0.33 | 0.81 | 6.93 | 0.22 | 0.26 |

The slag can be classified as basic type with normal hydraulic properties.

2) As C—Anhydrous sodium carbonate (Na$_2$CO$_3$), 99% purity (from VWR Chemicals).

3) As D—HEDP*4Na

Setting Time Measurement:

The setting time was measured using an automatic Vicatronic machine following the standards EN 196-3. The sample in pasty state is hold in a cylindrical mold of 40 mm height. At regular time intervals, a needle falls freely into the sample and penetrates at a certain depth, which is representative of the setting level. The moment when the needle penetrates into the sample at 35±1 mm depth is called the beginning of setting. The moment when the penetration depth is negligible is called the moment of final setting.

The paste samples were prepared using a standard mixing procedure (following EN 196-3). Depending upon the Water/GGBS (W/B) ratio considered, the appropriate quantity of admixtures C and D were dissolved in tap water. Then the solution was introduced into the paste and then mixed for 60 s at low speed. This is followed by 30 s of hand mixing. Finally a mixing for 30 s at low speed and 30 s at high speed were done. The lubricated sample-holder was filled with the obtained paste. The time between two (Vicat) setting tests was 10 minutes for a water/GGBS ratio of 0.40 and 5 minutes for 0.35. Ambient conditions were 22° C. and 70% HR.

Tested Formulations:

| Formulations | A (binder) (g) | C (g) | D (g) | W/B ratio |
|---|---|---|---|---|
| 1 control | 100 | 8 | 0 | 0.4 |
| 2 | 100 | 8 | 0.1 | |

-continued

| Formulations | A (binder) (g) | C (g) | D (g) | W/B ratio |
|---|---|---|---|---|
| 3 | 100 | 8 | 0.2 | |
| 4 control | 100 | 8 | 0 | 0.35 |
| 5 | 100 | 8 | 0.2 | |
| 6 | 100 | 8 | 0.3 | |
| 7 control | 100 | 6 | 0 | 0.4 |
| 8 | 100 | 6 | 0.1 | |
| 9 control | 100 | 6 | 0 | 0.35 |
| 10 | 100 | 6 | 0.1 | |
| 11 | 100 | 6 | 0.2 | |

Results:
The results for the setting time are reported in the table below. All the mixes containing the admixture D have extended setting times.

| Formulations | Setting time (min) |
|---|---|
| 1 | 80 |
| 2 | 120 |
| 3 | 370 |
| 4 | 20 |
| 5 | 80 |
| 6 | 240 |
| 7 | 130 |
| 8 | 370 |
| 9 | 60 |
| 10 | 160 |
| 11 | 290 |

Figure 2:
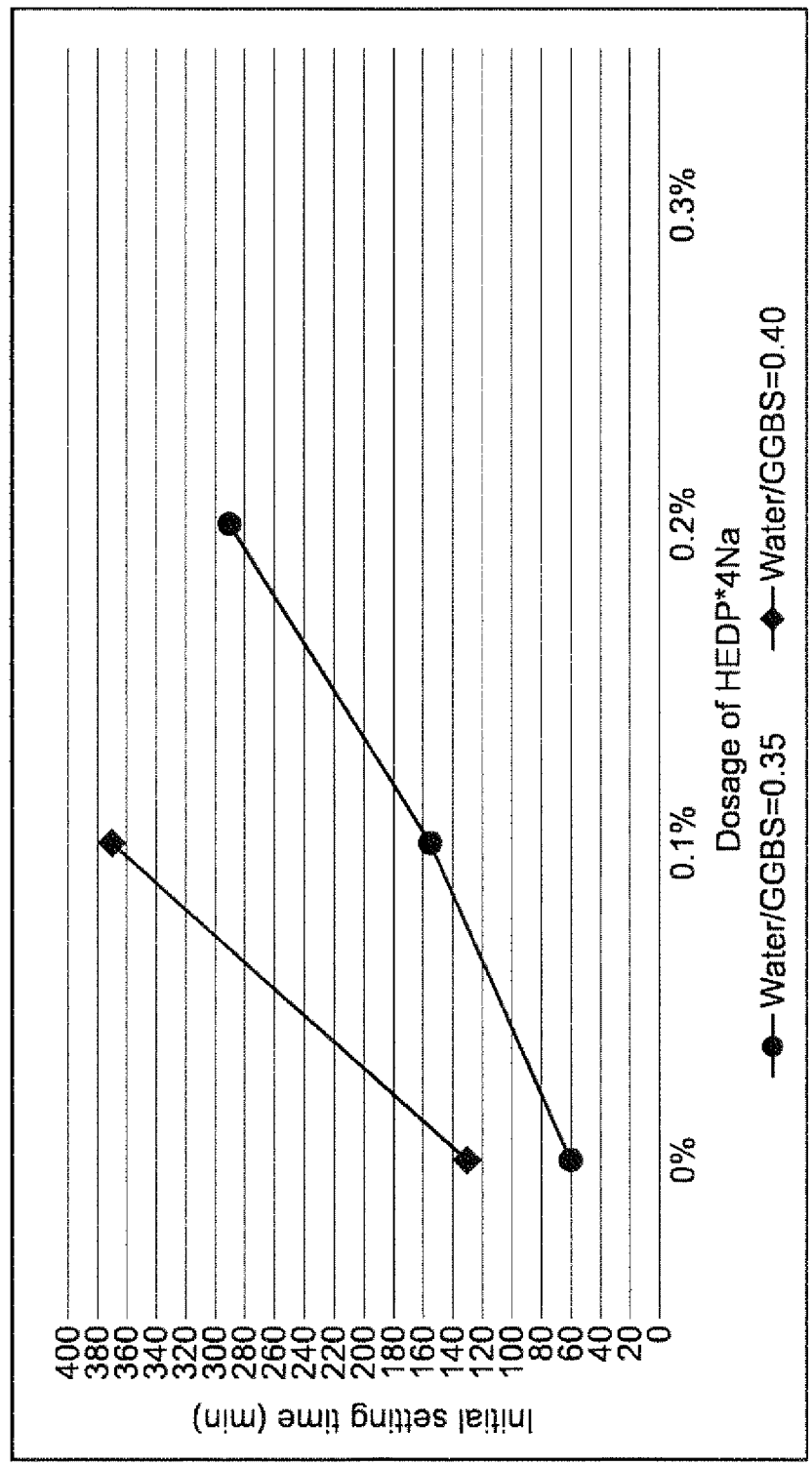

The results showing the impact of the chelatant D on the setting time are represented graphically in FIGS. 1-2.

Example 2: Rheology

Materials:
1) As A—GGBS as described in example 1
2) As A'—Limestone
   Granulometry: D50=12 µm from OMYA® company. France.
3) As C—anhydrous sodium carbonate (Na$_2$CO$_3$), 99% purity.
4) As D—HEDP*4Na Tested Compositions:

| | A (g) | A' (g) | C (g) | D (g) | W/B (A + A') |
|---|---|---|---|---|---|
| 0% control | 70 | 30 | 5.6 | 0 | 0.32 |
| 0.2% | 70 | 30 | 5.6 | 0.2 | 0.32 |

Procedure of the Rheology Test:
A cementitious material in fresh state is characterized by at least two rheological parameters: a yield stress and viscosity. The yield stress is related to the capacity of the material to resist flow initiation (related to slump or spreading tests for concretes and mortars), and the viscosity characterizes the resistance of the material to maintain flow at a given rate (related to flow time).

A laboratory rheometer (AR2000 EX from TA Instruments) was used. The material was sheared between a rotating 4-blades Vane tool and a cylindrical cup. The Vane-in cup geometry was chosen in order to minimize wall-slip since the sample is sheared in volume. The temperature of sample was controlled and fixed to 20° C. The test consisted first of 30 s pre-shearing at 30 (1/s) to erase flow history and start with approximately the same sample microstructure for the all the tests. This is followed by a two-step procedure: shear-rate increase from 0.1 to 50 (1/s) and then a decrease from 50 to 0.1 (1/s). The results are expressed in terms of stress versus shear-rate (flow curves). Only the downward flow curves are reported here due their better repeatability. The stress at zero shear-rate is identified as the yield stress and the slope of the flow curve is the plastic viscosity.

The pastes were prepared by kneading 75 g of dry-mixed powder in tap water and mixed during 2 min at 500 rpm (over 30 s).

Figure 3:
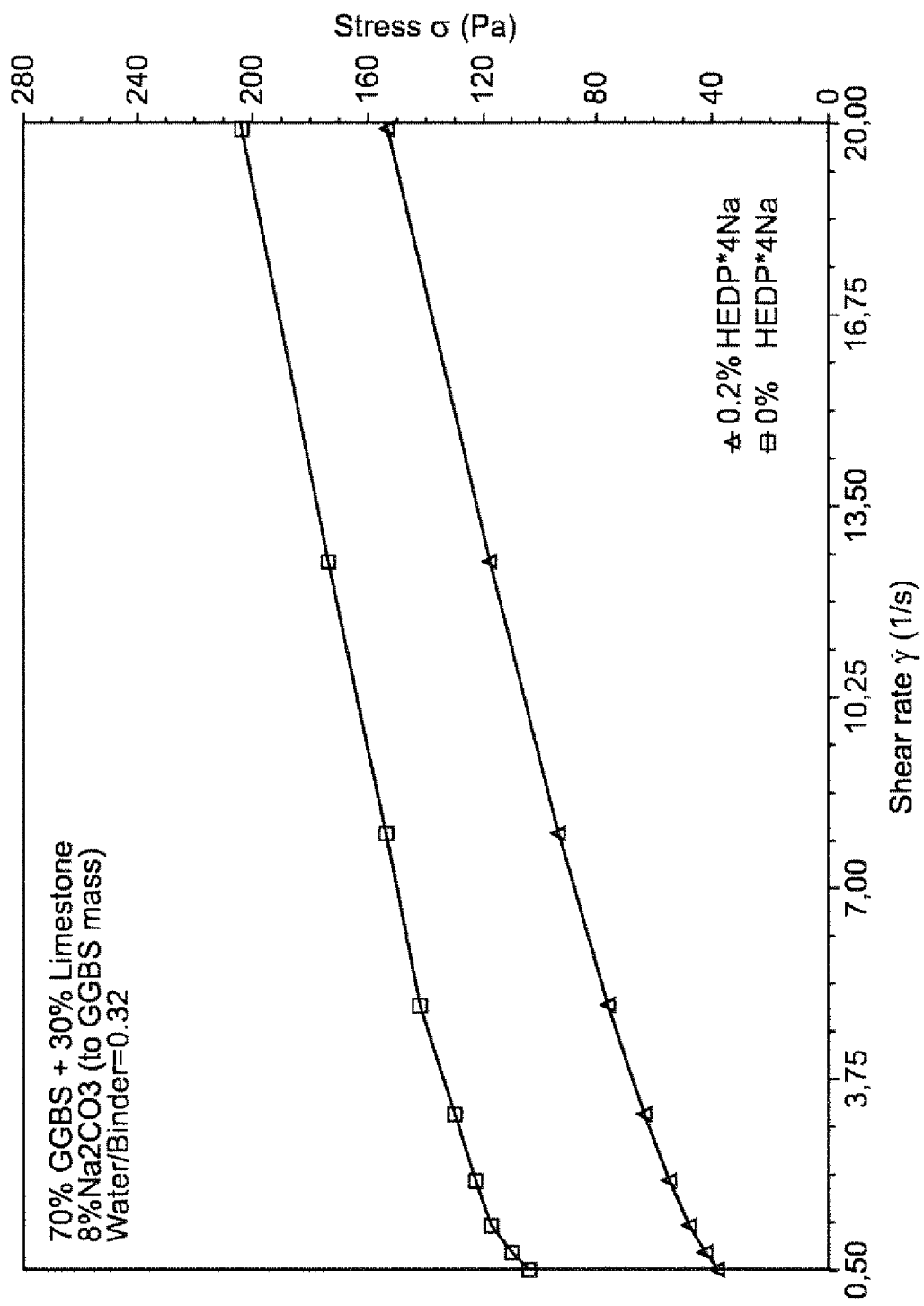
FIGS. 3, 4, and 5 are graphics representing stress versus shear rate.

Results:
The results are shown in FIG. 3.
The addition of component D reduces both the viscosity and the yield stress. Therefore the binder paste mix-designed according to the invention is characterized by improved workability even at low W/B ratio of 0.32.

Example 3: Rheology and Open (or Workability) Time

Materials:
1) As A—GGBS as defined in example 1
2) As A'—Limestone
   Granulometry: D50=12 µm from OMYA® company. France.
3) As B—The hydrated lime used is commercialized by Carmeuse company
4) As C—anhydrous sodium carbonate 99% purity Na$_2$CO$_3$
5) As D—HEDP*4Na Tested Compositions:

| | A (g) | A' (g) | B (g) | C (g) | D (g) | W/B (A + A' + B) |
|---|---|---|---|---|---|---|
| 0.2% | 70 | 30 | 0.5 | 5.6 | 0 | 0.3 |
| 0.3% | 70 | 30 | 0.5 | 5.6 | 0.2 | 0.3 |

Procedure for the rheology test: Same as Example 2, except that the measurements were also performed after 30 minutes after mixing.

Figure 4:
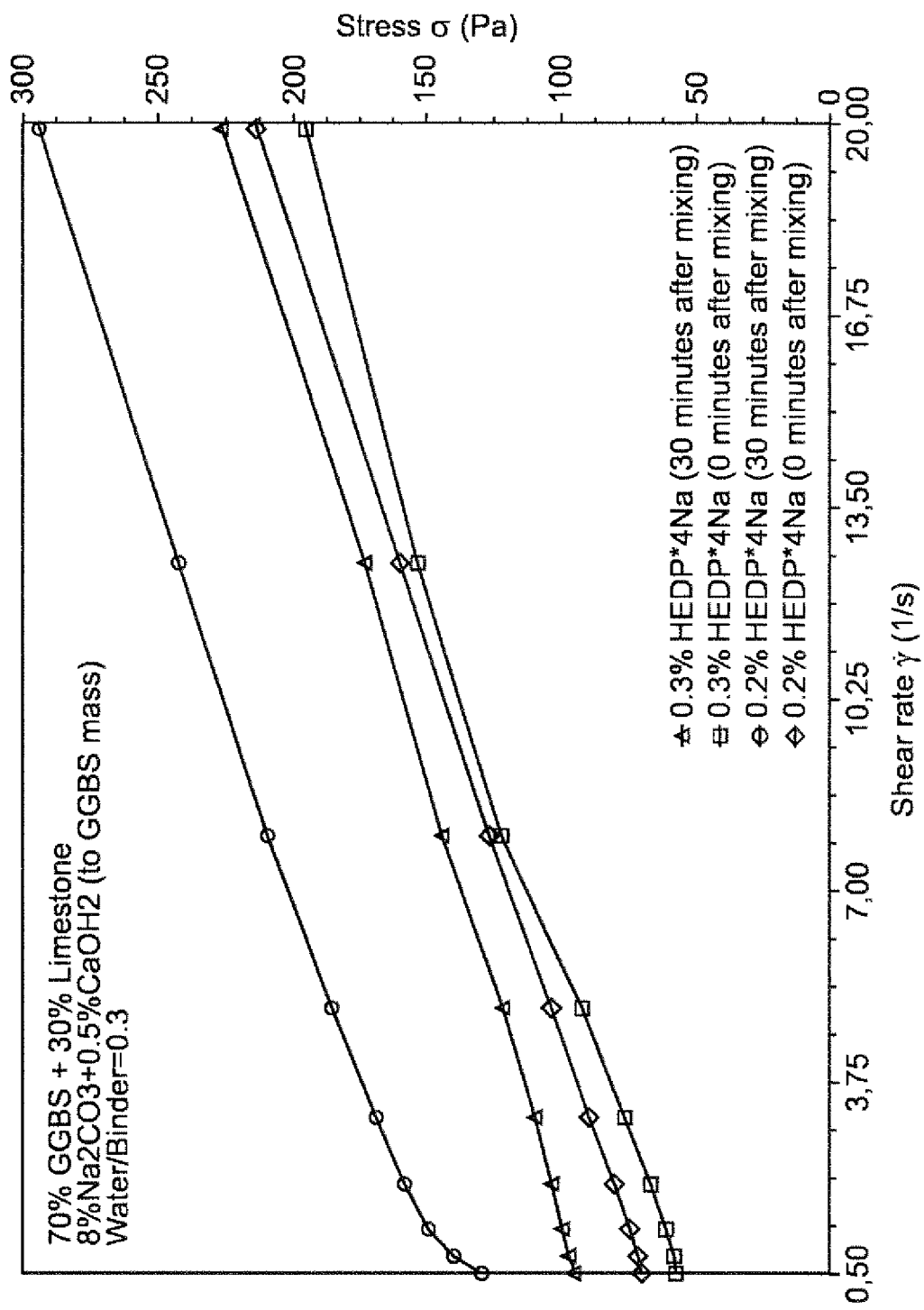

Results:
The results are shown in FIG. 4. First the increase of D concentration leads to the decrease of the yield stress and viscosity. After 30 minutes, the increase of the yield stress and viscosity is observed for both samples. It could be related to hydrates formation. With 0.3% of D, the increase of these parameters is significantly lower.

A test with 0% of D was impossible because the mixture was too viscous to be inserted into the rheometer shearing set-up from the beginning. And at 30 minutes, the mixture was set. Therefore, it is clear that D leads to increase of open or workability time of the product.

Example 4: Rheology

Materials:
1) As A(1)—GGBS as defined in example 1.
   As A(2)—GGBS with the same chemical composition as A(1) but with a different granulometry (D10=0.62 µm; D50=4.49 µm; D90=17.43 µm).
2) As A'(1)—Limestone as A' defined in example 3.
   As A'(2)—Crushed chalk which granulometry is: D50=1.2 µm from Omya France.

3) As C—anhydrous sodium carbonate 99% purity $Na_2CO_3$.
4) As D—HEDP*4Na,
Tested Compositions:

|  | A(1) (g) | A(2), gr. | A'(1), gr. | A'(2), gr. | C, gr. | D gr. | W/B(A + A') |
|---|---|---|---|---|---|---|---|
| 0% control | 66 | 4 | 22 | 8 | 4.8 | 0 | 0.32 |
| 0.1% | 66 | 4 | 22 | 8 | 4.8 | 0.1 | 0.32 |
| 0.4% | 66 | 4 | 22 | 8 | 4.8 | 0.4 | 0.32 |

Figure 5:
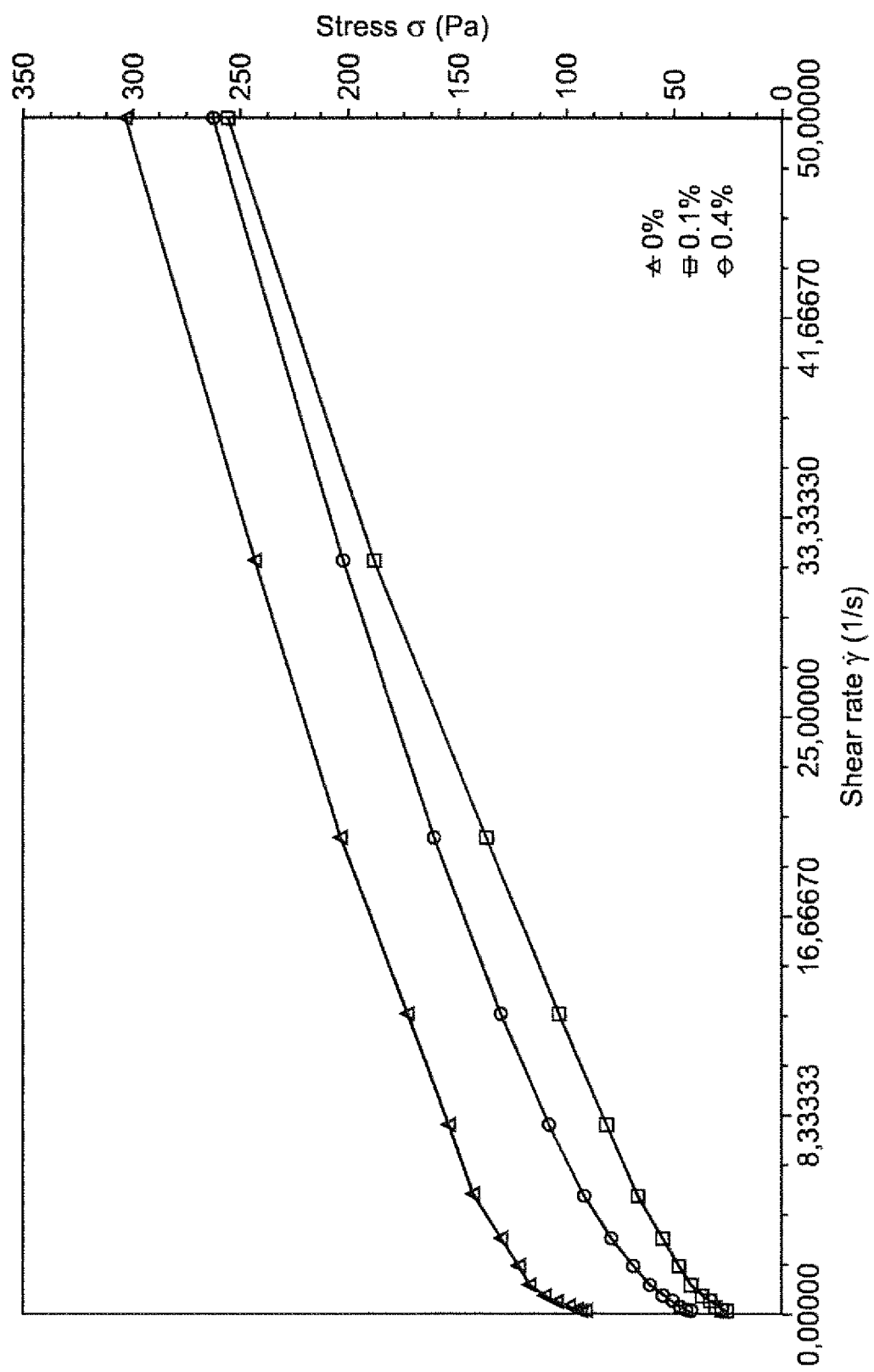

Principle of the rheology test: Same as example 2.
Procedure: Same as example 2.
Results:
As shown in FIG. 5, the introduction of D leads to a decrease of the yield stress and viscosity for the mixes. It means that the workability is improved with the increase of D concentration in the wet formulation.

Example 5: Strength

Materials:
1) As A(1)—GGBS as defined in example 1
As A(2)—GGBS with the same chemical composition as A(1) but with a different granulometry D10=0.62 μm; D50=4.49 n; D90=17.43 μm.
2) As A'(1)—Limestone as A' defined in example 3.
As A'(2)—Crushed chalk which granulometry is: D50=1.2 m from Omya France.
3) As B—quick lime from Carmeuse company
4) As C—anhydrous sodium carbonate 99% purity $Na_2CO_3$
5) As D—HEDP*4Na
Tested Compositions:

|  | A(1) g | A(2) g | A'(1) g | A'(2) g | B g | C g | D g | W/B (A + A' + B) | Normalized sand | Binder to Sand ratio |
|---|---|---|---|---|---|---|---|---|---|---|
| without | 56 | 4 | 22 | 8 | 0.5 | 4.8 | 0 | 0.28 | 300 | 1:3 |
| With HEDP*4Na | 56 | 4 | 22 | 8 | 0.5 | 4.8 | 0.2 | 0.28 | 300 | 1:3 |

Figure 6:
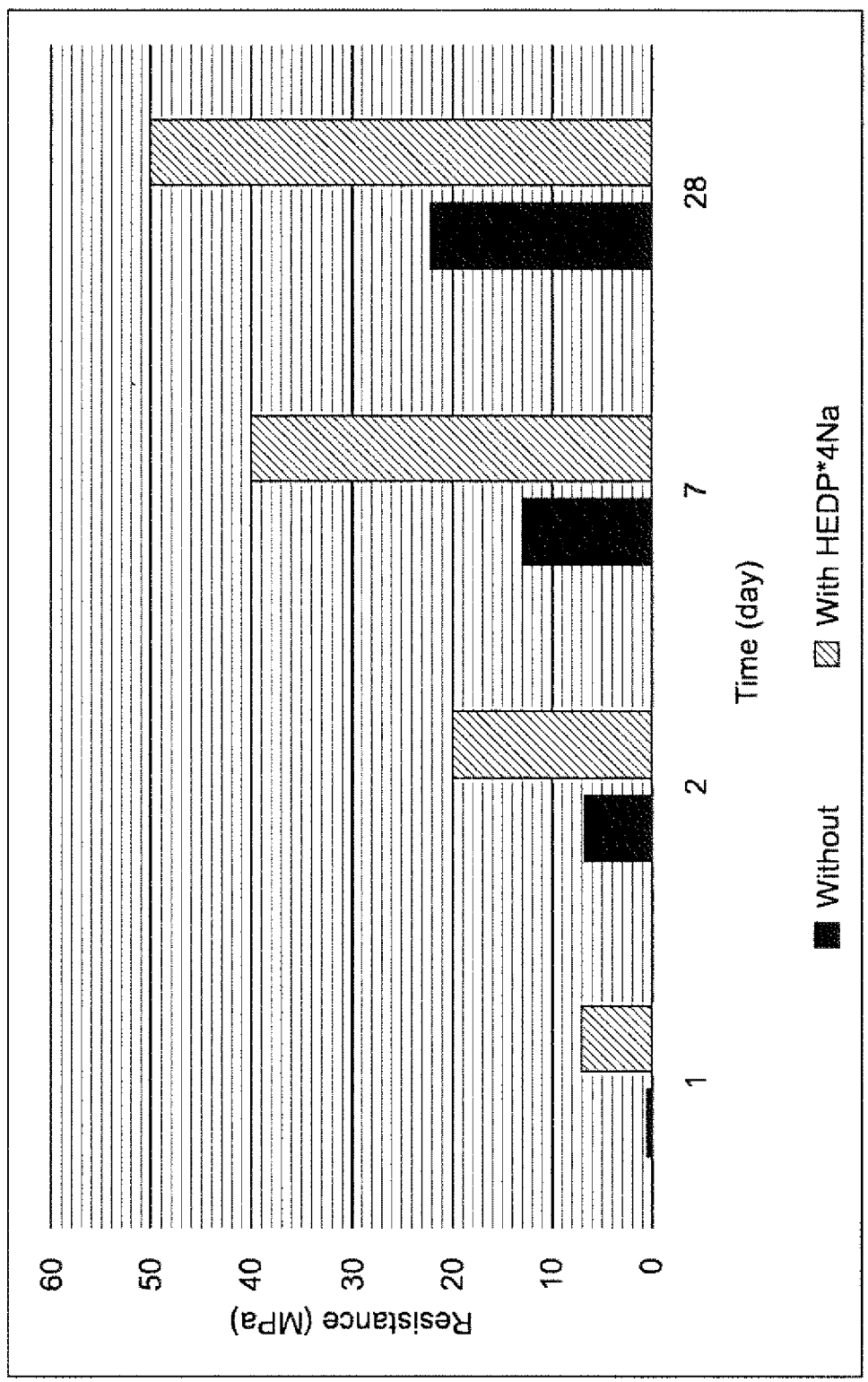
FIGS. 6 and 7 are bar diagrams showing strength versus time.

Procedure for Strength Measurements:
The mechanical tests were performed on standardized mortar samples (load area is 4 cm×4 cm).
The load was applied at a constant speed of 2.2 kN/s until complete breakage, according to EN 196-1.
Preparation of the Samples:
The binder was first mixed with the dry activator (C). Then, over continuous mixing at low speed the water solution (water+component D) was added. After 30 s of the mixing at low speed, the sand was added and the mixing was performed for more 30 s. Then the mixing process was stopped for 90 s. During this pause for the paste was mixed manually during 30 s. The mixing was then continued at low speed for 30 s and subsequently at high speed for 30 s.
Standard steel molds (EN 196) were filled in three layers. Each layer was filled for 30 s with vibration and manual compaction. The same vibration time and the same picking force were implemented for the two types of samples. The samples were demolded after 24 h. The storage conditions were 22° C. and 95% HR.
Results:
FIG. 6 represents the compressive strength development of the mortars up to 28 days. These results illustrate the significant increase of the compressive strength of the mortars at all terms when the chelatant D is included in the mix.

Example 6: Strength Development

Materials:
1) As A—GGBS as defined in example 1
1) As C—anhydrous sodium carbonate 99% purity $Na_2CO_3$
2) As D—HEDP*4Na
3) As E—superplasticizer, polycarboxylate ether.
Tested Compositions:

|  | A (g) | (C) g | D (g) | E (g) | W/B (A) | Normalized sand | Binder to Sand ratio |
|---|---|---|---|---|---|---|---|
| without | 100 | 8 | 0 | 1 | 0.35 | 300 | 1:3 |
| With HEDP*4Na | 100 | 8 | 0.2 | 1 | 0.35 | 300 | 1:3 |

Figure 7:
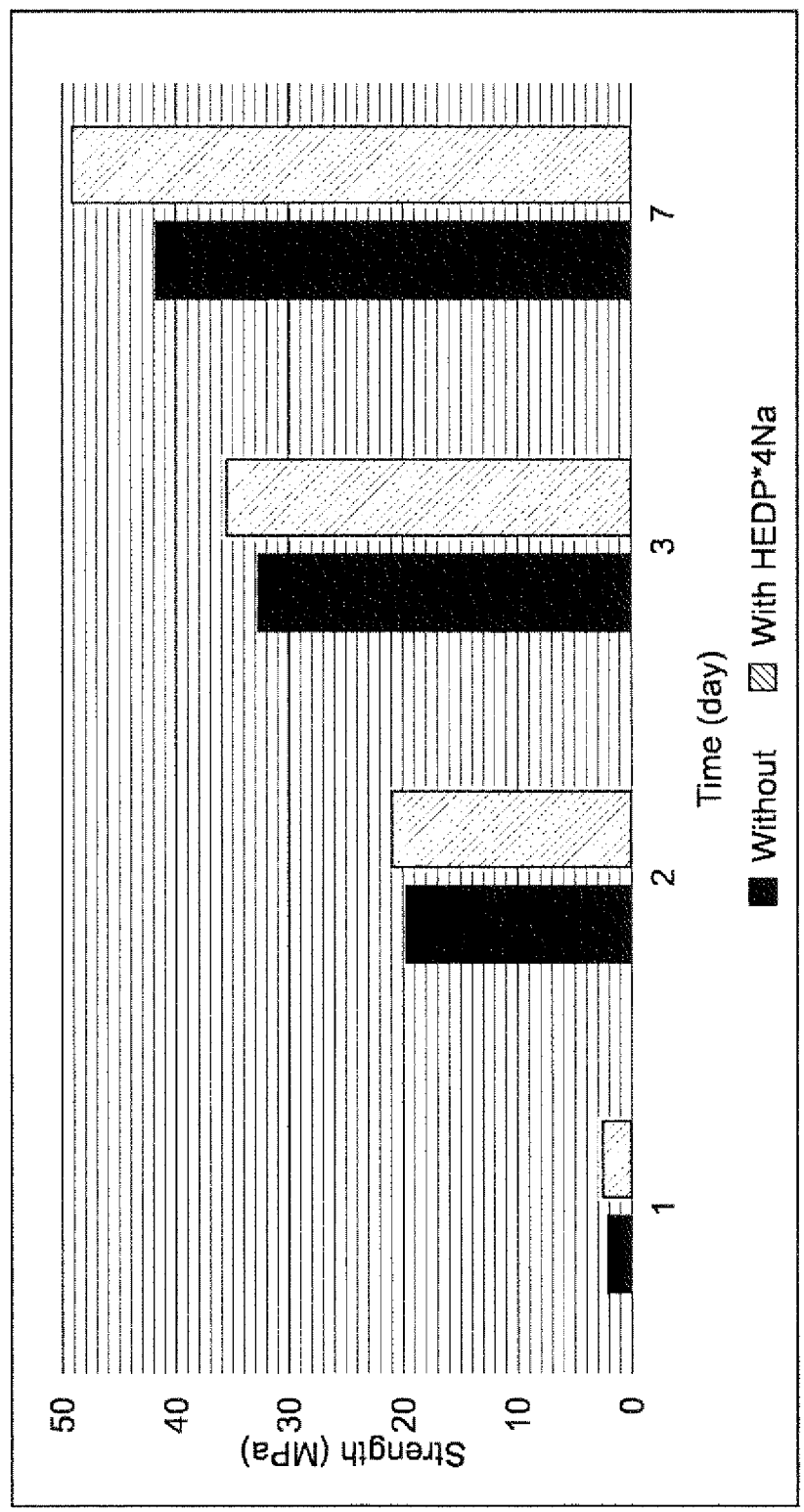

Procedure for Strength Determination Tests: Same as Example 5
Procedure for sample preparation: It is the same as in example 5, except that only vibration was used to fill the mold. Different durations of vibration were required to reach the same density for the two types of samples: 20-30 s per layer for the sample comprising the chelatant D and 60-70 s for the sample without D.
Results:
As shown in FIG. 7, although the density was almost the same for the control and for the sample according to the invention (2280 kg/m3 for the control and 2300 kg/m3 with component D), the strength in presence of D is higher. More importantly, this example shows that the filling ability of the product in presence of D is significantly enhanced.

Example 7: Rheology

Materials:
1) As A—GGBS as defined in example 1.
2) As A'—Limestone as defined in example 3.
3) As C—Sodium hydroxide 99.5% purity was used.
4) As D—EDTMP*4Na*Ca.
Tested Compositions:

|  | A (g) | A' (g) | C (g) | D (g) | W/B (A + A') |
|---|---|---|---|---|---|
| 0% Control | 50 | 50 | 1.5 | 0 | 0.315 |
| 0.15% | 50 | 50 | 1.5 | 0.15 | 0.315 |

Figure 8:
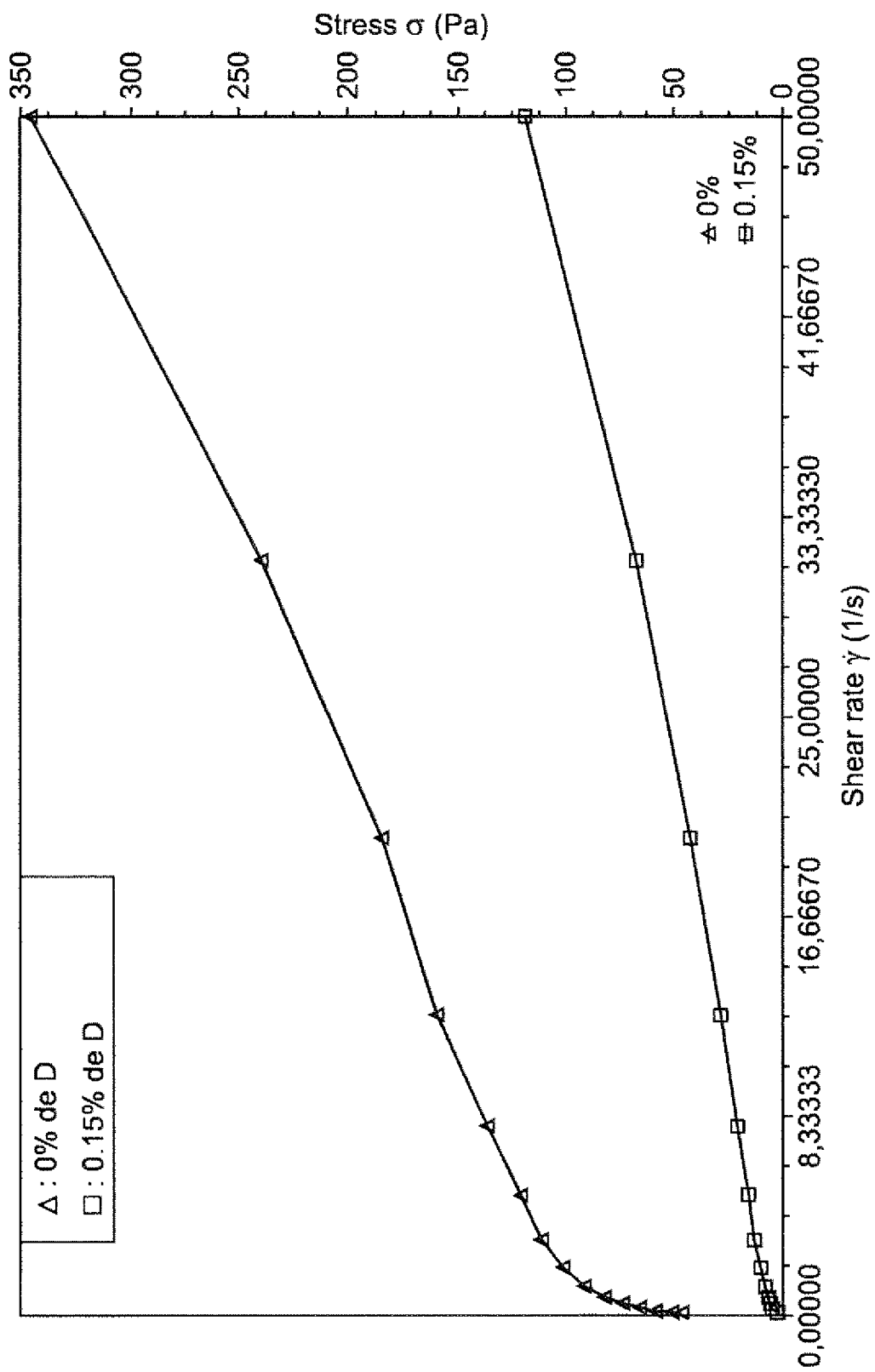
FIGS. 8, 9, and 10 are graphics representing stress versus shear rate.

Principle of the Rheology Test Same as in Example
Procedure: Same as in Example 2
Results:
As shown in FIG. 8, D leads to the decrease on the yield stress and viscosity in the case of a different type of GGBS activation (NaOH).

Example 8: Rheology

Materials:
1) As A—GGBS as defined in Example 1
2) As A'—Limestone as defined in Example 3.
3) As C—Anhydrous sodium sulphate, 99% purity from Alfa Aesar
4) As D—HEDP*4Na Tested Compositions:

|  | A (g) | A' (g). | C (g) | D (1, 2, 3) (g) | W/B (A + A') |
|---|---|---|---|---|---|
| 0% | 50 | 50 | 4 | 0 | 0.36 |
| 0.2% | 50 | 50 | 4 | 0.2 | 0.36 |

Figure 9:
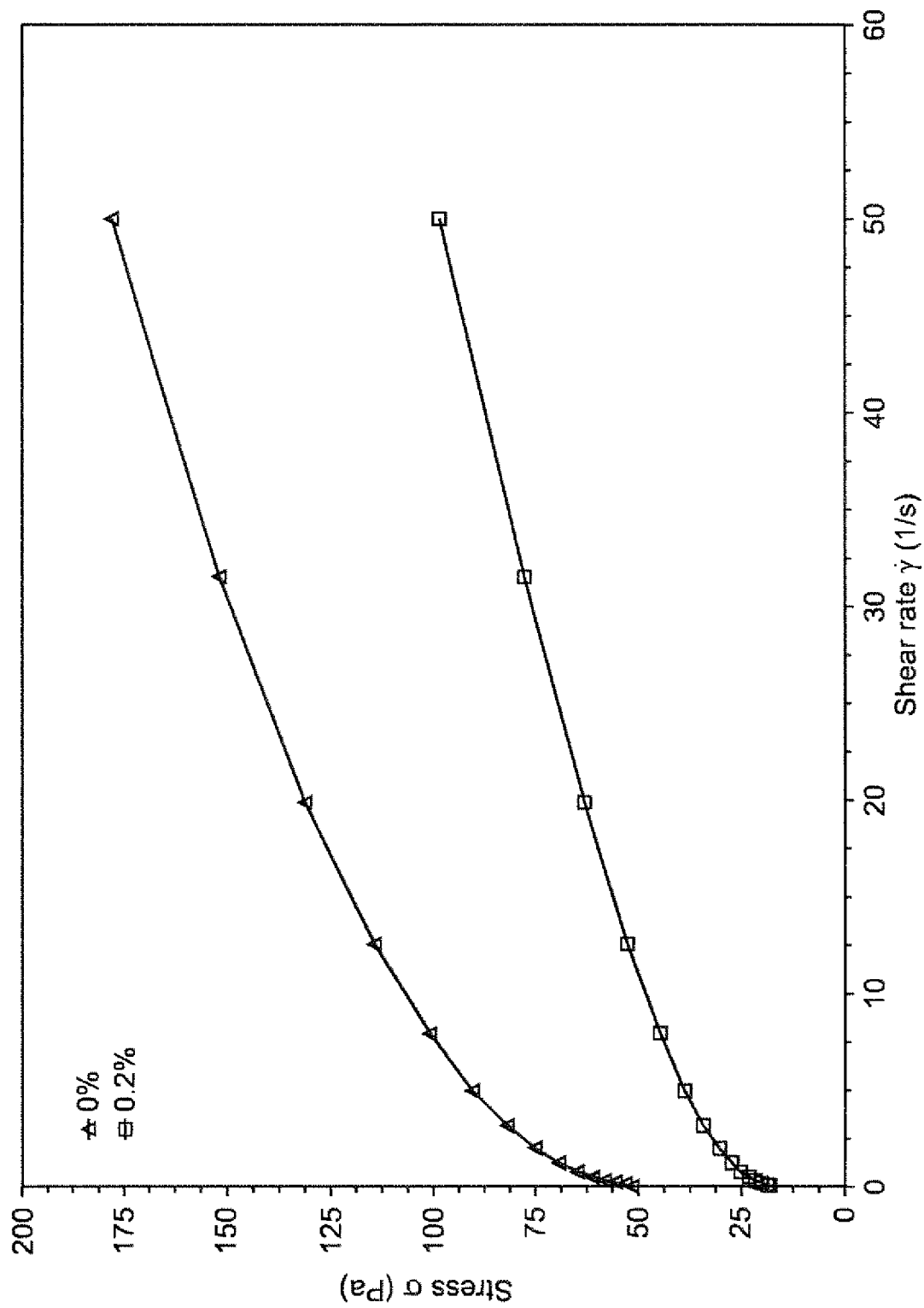
Figure 10:
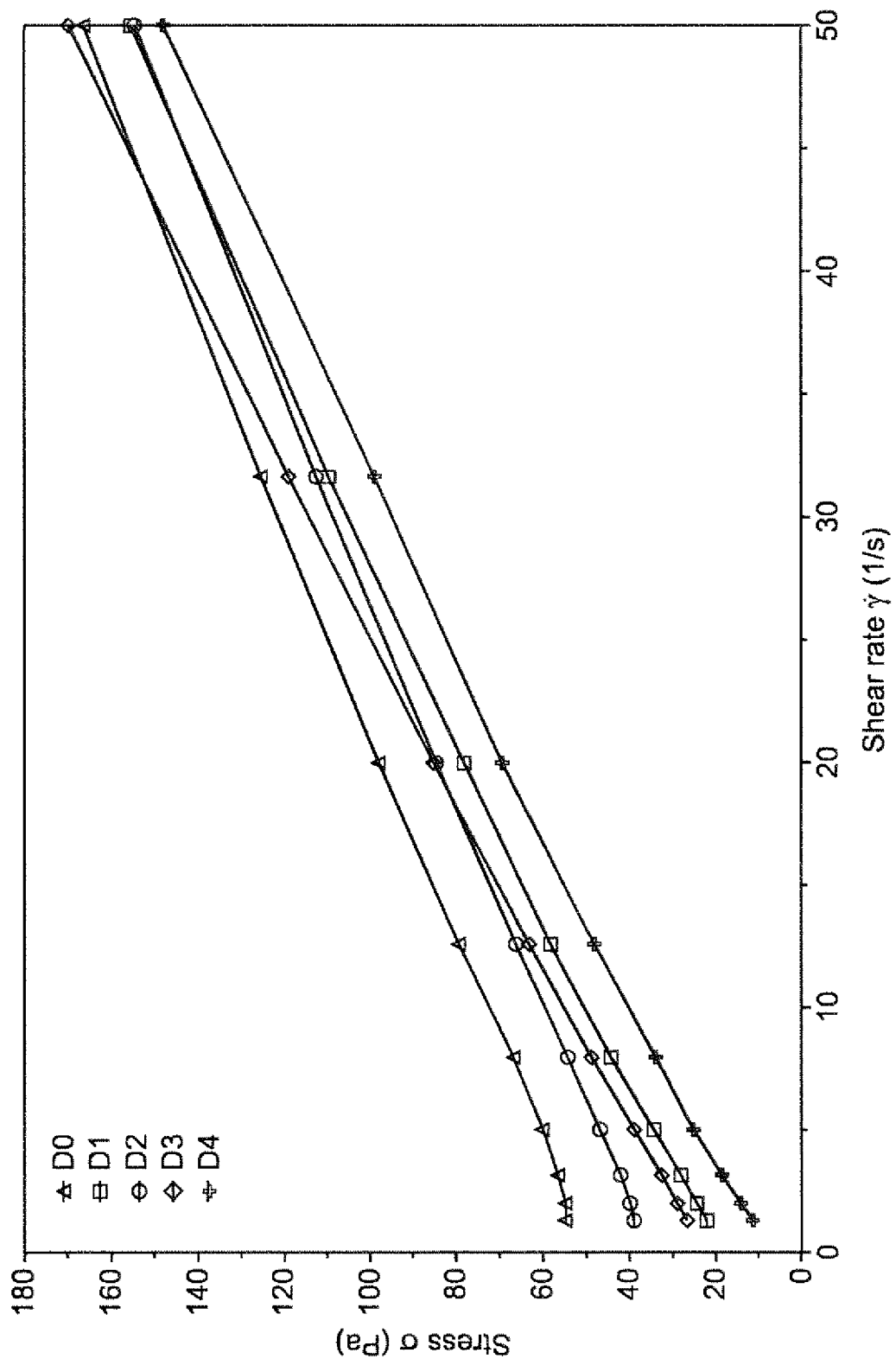

Principle of the Rheology Test: Same as Example 2
Procedure: Same as Example 2
Results:
As shown in FIG. 9, D leads to the decrease on the yield stress and viscosity also in case of $Na_2SO_4$ activation. This means an improvement of the workability.

Example 9: Rheology

Materials:
1) As A—GGBS as defined in example 1
2) As C—anhydrous sodium carbonate 99% purity $Na_2CO_3$
3) As D 1—tripolyphosphate
As D2—hexametaphosphate
As D3—HEDP*4Na
As D4—EDTMP*4Na*Ca Tested Compositions:

|  | Component A (g) | Component C (g) | Component D1 (g) | Component D2 (g) | Component D3 (g) | Component D4 (g) | Water/Binder (A + A') |
|---|---|---|---|---|---|---|---|
| D0control | 100 | 8 | 0 | 0 | 0 | 0 | 0.4 |
| D1 | 100 | 8 | 0.2 | 0 | 0 | 0 | 0.4 |
| D2 | 100 | 8 | 0 | 0.2 | 0 | 0 | 0.4 |
| D3 | 100 | 8 | 0 | 0 | 0.2 | 0 | 0.4 |
| D4 | 100 | 8 | 0 | 0 | 0 | 0.2 | 0.4 |

Figure 11:
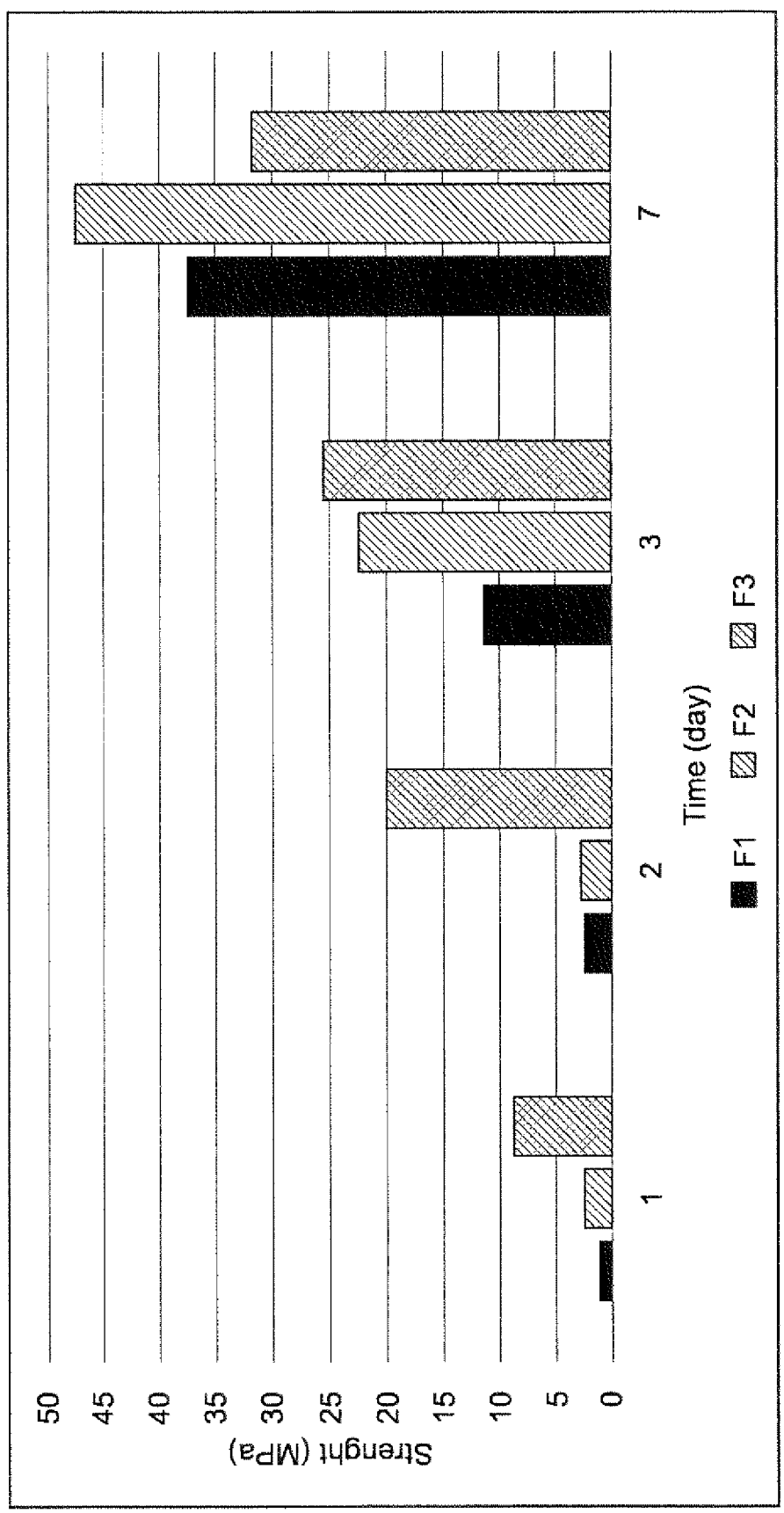
FIG. 11 is a bar diagram showing strength versus time.

Principle of the Rheology Test: Same as in Example 2.
Procedure: Same as in Example 2.
Results:
As shown in FIG. 11, D1, D2, D3 lead to the decrease on the yield stress and viscosity in case of $Na_2SO_4$ activation. This means an improvement of the workability.

Example 10: Strength Development

Materials:
1) As A—GGBS as defined in Example 1
2) As A'—Limestone as limestone A'(2) defined in Example 4
3) As B—A clinker of Portland cement
4) As C—Anhydrous sodium carbonate ($Na_2CO_3$), 99% purity
5) As, D—HEDP*4Na
6) As E—Superplasticizer, polycarboxylate ether Tested Compositions:

|  | A (g). | A' (g) | B (g). | C (g) | D (g) | E (g) | W/B (A + B) | Normalized sand | Binder to Sand ratio |
|---|---|---|---|---|---|---|---|---|---|
| Control F1 | 100 | 0 | 0 | 8 | 0.1 | 1 | 0.4 | 300 | 1:3 |
| F2 | 95 | 5 | 0 | 7.6 | 0.095 | 1 | 0.4 | 300 | 1:3 |
| F3 | 90 | 5 | 5 | 7.2 | 0.095 | 1 | 0.4 | 300 | 1:3 |

Principle of the Compressive Strength Test: Same as Example 5
Sample Preparation Procedure: Same as in Example 5
Results:
As shown in FIG. 11, D with or without a co-binder B (OPC) is favorable to the increase of strength at 1, 2, 3 & 7 days, compared to the control.

Example 11: Influence of Phosphonates (HEDP*4Na) on GGBS with 8% $Na_2CO_3$ at W/B=0.40

Materials:
1) As A—GGBS as described in example 1
2) As C—anhydrous sodium carbonate ($Na_2CO_3$), 99% purity.
3) As D—HEDP*4Na Tested Compositions:

| A (g) | C (g) | D (g) | W/B |
|---|---|---|---|
| 100 | 8 | 0 | 0.4 |
| 100 | 8 | 0.05 | 0.4 |
| 100 | 8 | 0.1 | 0.4 |
| 100 | 8 | 0.2 | 0.4 |
| 100 | 8 | 0.3 | 0.4 |

Figure 12:
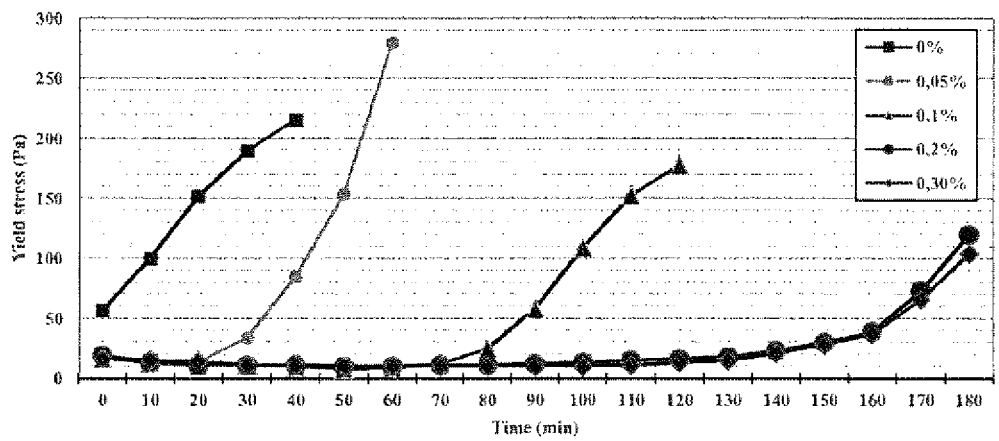
FIG. 12 is graphics represented yield stress versus time.

Yield Test: Confer Supra Example 2
Results:
The results are shown in FIG. 12.
Addition of phosphonates D extends the open time and lead to a decreasing of yield stress values.

Example 11A: Influence of GGBS Fineness with 8% $Na_2CO_3$ at W/B=0.40

Materials
1) As A—GGBS as described in example 1
2) As C—anhydrous sodium carbonate ($Na_2CO_3$), 99% purity.
3) As D—HEDP*4Na Tested Compositions:

| Assays | A (g) | A fineness (cm²/g Blaine) | C (g) | D (g) | W/B |
|---|---|---|---|---|---|
| 1 | 100 | 4500 | 8 | 0 | 0.4 |
| 2 | 100 | 5300 | 8 | 0.05 | 0.4 |
| 3 | 100 | 95% 4500 & 5% 12000 | 8 | 0.1 | 0.4 |

Figure 12A:
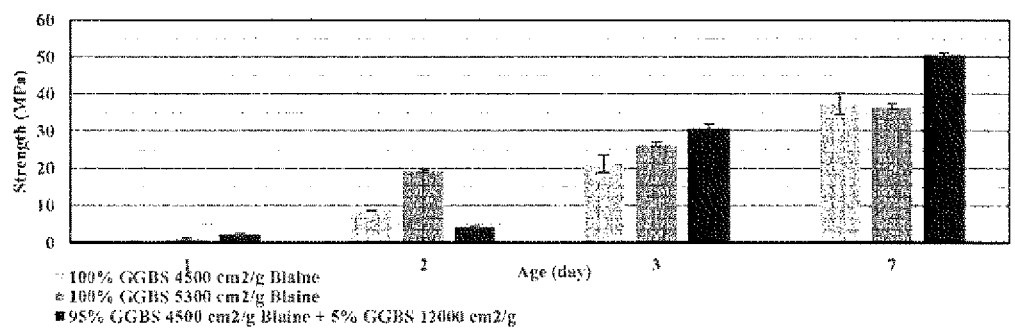
FIGS. 12A and 12B are bar diagrams showing the strength versus time.

Compressive Strength: Confer Supra Example 5
Results:
The results are shown in FIG. 12A.
Increasing of GGBS fineness has a positive effect on a compressive strength development.

Example 11B: Influence of GGBS Fineness with 8% $Na_2CO_3$ at W/B=0.40

Materials:
1) As A—GGBS as described in example 1
2) As C—anhydrous sodium carbonate ($Na_2CO_3$), 99% purity.
3) As D—HEDP*4Na Tested Compositions:

| Assays | A (g) | A fineness (cm²/g Blaine) | C (g) | D (g) | W/B |
|---|---|---|---|---|---|
| 1 | 100 | 4500 | 8 | 0 | 0.4 |
| 2 | 100 | 5300 | 8 | 0.05 | 0.4 |
| 3 | 100 | 95% of 4500 & 5% 12000 | 8 | 0.1 | 0.4 |
| 4 | 100 | 95% 4500 & 10% 12000 | 8 | 0.1 | 0.4 |

Figure 12B:
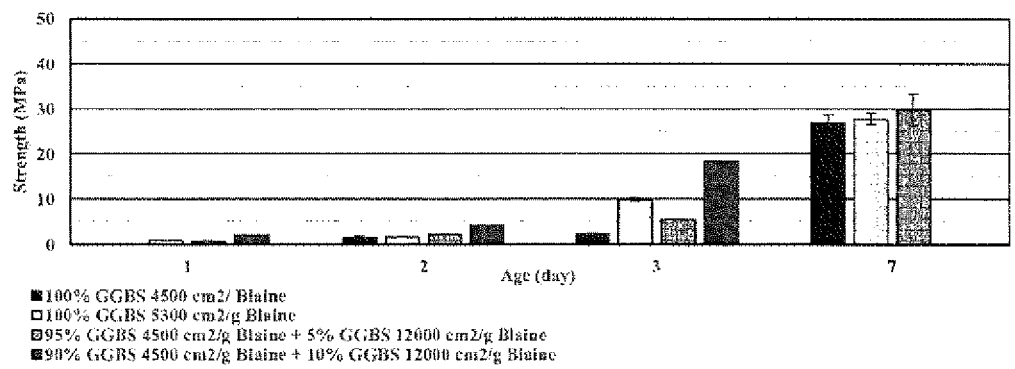

Compressive Strength: Confer Supra Example 5 Except the Storage is at 15° C. Instead of 22° C.
Results:
The results are shown in FIG. 12B.
Increasing of GGBS fineness has a positive effect on a compressive strength developmental so at 15° C. storage.

Example 12: Embodiment $E^{b2}$

Materials:
1) As A—GGBS as described in example 1
2) As B—OPC clinker with a Blaine fineness of 2500 cm²/g
Clinker composition:

| CaO | SiO2 | $Al_2O_3$ | $Fe_2O_3$ | TiO2 | MgO | $Na_2O$ | $K_2O$ |
|---|---|---|---|---|---|---|---|
| 65.2 | 21.7 | 5.0 | 3.3 | 0.2 | 1.5 | 0.18 | 0.73 |

3) As C—anhydrous sodium carbonate ($Na_2CO_3$), 99% purity.
4) As D—HEDP*4Na

Tested Compositions:

| | A (g) | B (g) | C (g) | D (g) | W/B (A) |
|---|---|---|---|---|---|
| 0% control | 100 | 5 | 8 | 0 | 0.40 |
| 0.2% | 100 | 5 | 8 | 0.1 | 0.40 |

Figure 13:
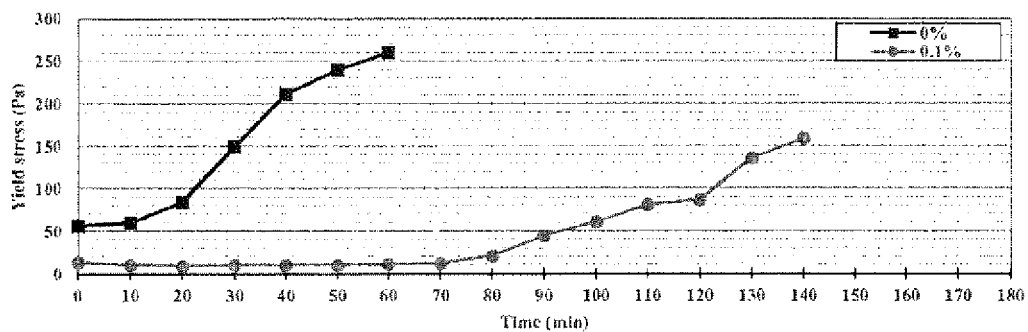
FIGS. 13, 14, and 15 are graphics represented yield stress versus time.

Yield Test: Confer Supra Example 2
Results:
The results are shown in FIG. 13.
Addition of phosphonates D leads to improving of rheology also in case of GGBS with partial replacement by ordinary Portland clinker activated with sodium carbonate (FIG. 13).

Example 13: Embodiment $E^{b2}$

Materials:
1) As A—GGBS as described in example 1
2) As B—OPC clinker as in example 12
3) As C—anhydrous sodium carbonate ($Na_2CO_3$), 99% purity.
4) As D—HEDP*4Na Tested Compositions:

| | A (g) | B (g) | C (g) | D (g) | W/B (A) |
|---|---|---|---|---|---|
| 0% control | 100 | 0 | 6 | 0.1 | 0.40 |
| 5% | 100 | 5 | 6 | 0.1 | 0.40 |

Figure 14:
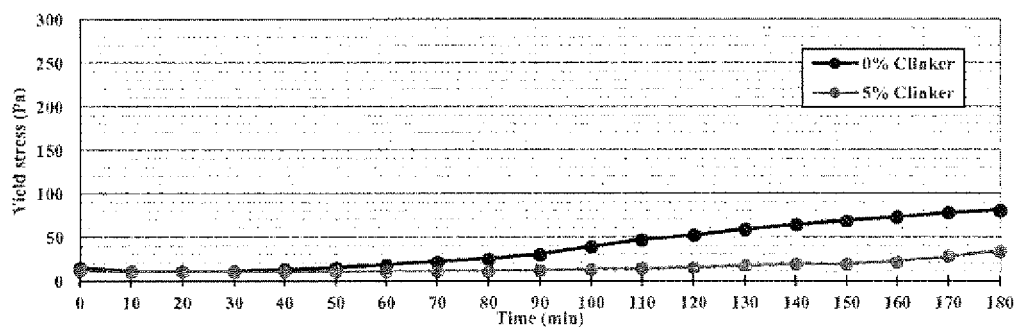

Yield Test: Confer Supra Example 2
Results:
The results are shown in FIG. 14.

Example 14: Embodiment $E^{b2}$

Materials:
1) As A—GGBS as described in example 1
2) As B—OPC clinker with a Blaine fineness of 2500 cm$^2$/g
   Clinker composition: as in example 12.
3) As C—anhydrous sodium carbonate (Na$_2$CO$_3$), 99% purity.
4) As D—HEDP*4Na Tested compositions:

|  | A (g) | B (g) | C (g) | D (g) | W/B (A) |
|---|---|---|---|---|---|
| 0% control | 100 | 0 | 8 | 0.1 | 0.40 |
| 5% | 100 | 5 | 8 | 0.1 | 0.40 |

Figure 15:
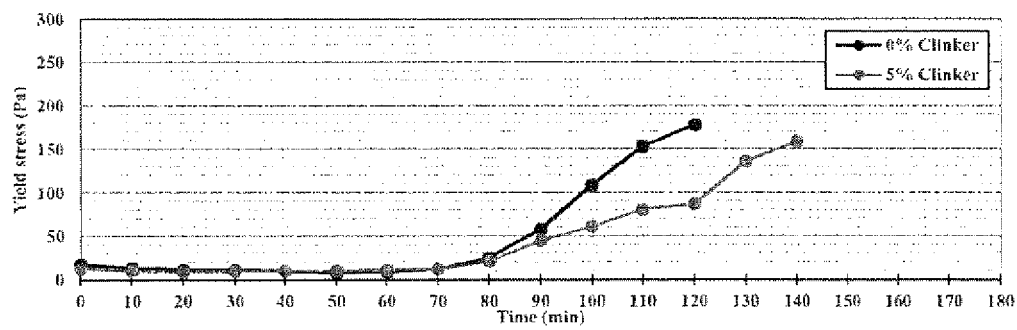

Yield Test: Confer Supra Example 2
Results:
The results are shown in FIG. 15.
Phosphonates have a greater influence on rheology if some part of GGBS was replaced by ordinary Portland clinker (FIGS. 14&15).

Example 15: Embodiment $E^{b2}$

Materials:
1) As A—GGBS as described in example 1
2) As B—OPC clinker with a Blaine fineness of 2500 cm$^2$/g
   Clinker composition: as in example 12.
3) As C—anhydrous sodium carbonate (Na$_2$CO$_3$), 99% purity.
4) As D—HEDP*4Na
Tested Compositions:

| Assays | A (g) | B (g) | C (g) | D (g) | W/B (A) |
|---|---|---|---|---|---|
| 1 | 100 | 5 | 8 | 0 | 0.40 |
| 2 | 100 | 5 | 8 | 0.05 | 0.40 |
| 3 | 100 | 5 | 8 | 0.10 | 0.40 |
| 4 | 100 | 5 | 8 | 0.20 | 0.40 |
| 5 | 100 | 5 | 8 | 0.30 | 0.40 |

Figure 16:
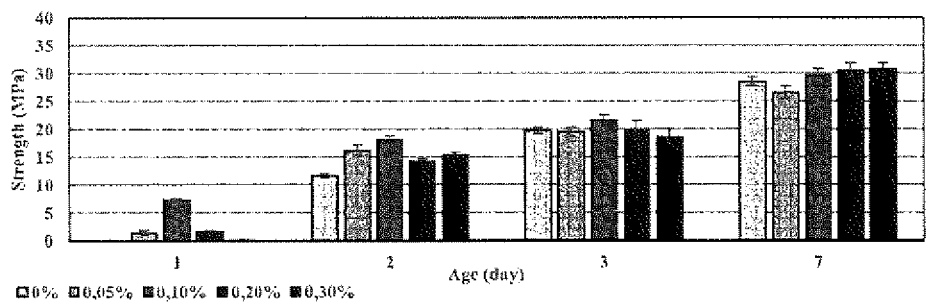
FIGS. 16, 17, 18, 19, 20, 21, 22, and 23 are bar diagrams showing strength versus time.

Compressive Strength (Strength MPa): Confer Supra Example 5
Results:
The results are shown in FIG. 16. At the age of the 1 day, addition of 0.1% HEDP*4Na leads to a very noticeable increasing of the compressive strength.

Example 16: Embodiment $E^{b2}$

Materials:
1) As A—GGBS as described in example 1
2) As B—OPC clinker with a Blaine fineness of 2500 cm$^2$/g
   Clinker composition: as in example 12.
3) As C—anhydrous sodium carbonate (Na$_2$CO$_3$), 99% purity.
4) As D—HEDP*4Na
Tested Compositions:

| Assays | A (g) | B (g) | C (g) | D (g) | W/B (A) |
|---|---|---|---|---|---|
| 1 | 100 | 0 | 8 | 0.1 | 0.40 |
| 2 | 100 | 1 | 8 | 0.1 | 0.40 |
| 3 | 100 | 3 | 8 | 0.1 | 0.40 |
| 4 | 100 | 5 | 8 | 0.1 | 0.40 |

Figure 17:
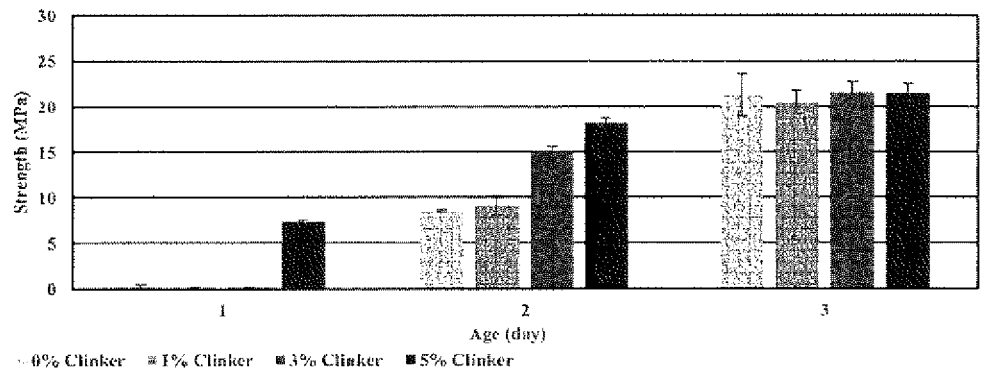

Compressive Strength (Strength MPa): Confer Supra Example 5
Results:
The results are shown in FIG. 17. Component B promotes the strength at the early age (1-2 d).

Example 17: Embodiment $E^{b2}$

Materials:
1) As A—GGBS as described in example 1
2) As B—OPC clinker with a Blaine fineness of 2500 cm$^2$/g
   Clinker composition: as in example 12.
3) As C—anhydrous sodium carbonate (Na$_2$CO$_3$), 99% purity.
4) As D—HEDP*4Na
Tested Compositions:

| Assays | A (g) | B (g) | C (g) | D (g) | W/B (A) |
|---|---|---|---|---|---|
| 1 | 100 | 5 | 8 | 0 | 0.40 |
| 2 | 100 | 5 | 8 | 0.1 | 0.40 |

Figure 18:
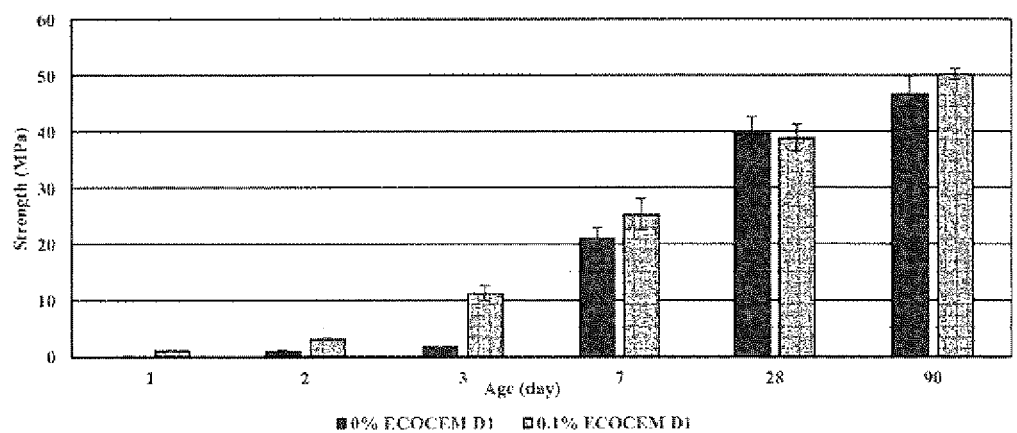

Compressive Strength (Strength MPa): Confer Supra Example 5 Except that the Storage Temperature is 15° C. Instead of 22° C.
Results:
The results are shown in FIG. 18. Phosphonates have an acceleration effect on compressive strength development at 15° C. and at early age (1-3 days), when used in a mix of GGBS with ordinary Portland clinker and activated with sodium carbonate.

Example 19: Embodiment $E^{b2}$

Materials:
1) As A—GGBS as described in example 1
2) As B—OPC clinker with a Blaine fineness of 2500 cm$^2$/g
   Clinker composition: as in example 12.
3) As C—anhydrous sodium carbonate (Na$_2$CO$_3$), 99% purity.
4) As D—HEDP*4Na
Tested Compositions:

| Assays | A (g) | A fineness (cm$^2$/g Blaine) | B (g) | C (g) | D (g) | W/B |
|---|---|---|---|---|---|---|
| 1 | 100 | 4500 | 5 | 8 | 0.1 | 0.4 |
| 2 | 100 | 5300 | 5 | 8 | 0.1 | 0.4 |

Figure 19:
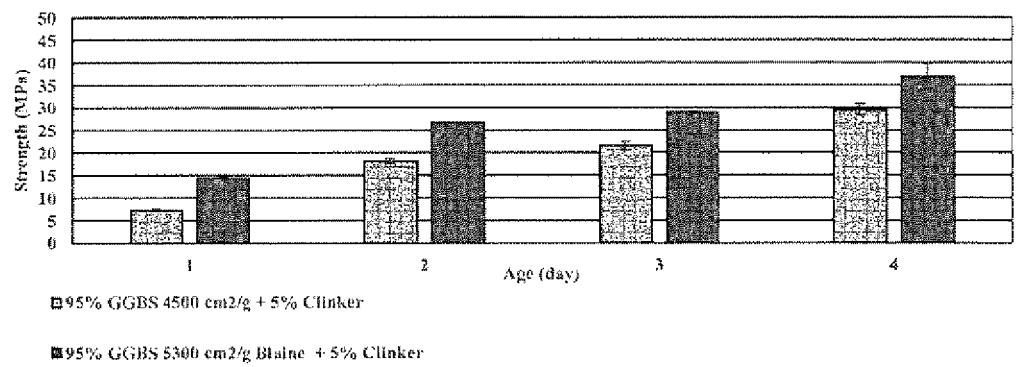

Compressive Strength (Strength MPa): Confer Supra Example 5.
Results:
The results are shown in FIG. 19. Increasing of GGBS fineness: when some part of GGBS is replaced by ordinary Portland clinker, it leads to an increasing of early age strength.

Example 20: Embodiment $E^{b2}$

Materials:
1) As A—GGBS as described in example 1 with an additional Bf
2) As B—OPC clinker with a Blaine fineness of 2500 cm/g
   Clinker composition: as in example 12.
3) As C— anhydrous sodium carbonate ($Na_2CO_3$), 99% purity.
4) As D—HEDP*4Na Tested Compositions:

| Assays | A (g) | A fineness ($cm^2$/g Blaine) | B (g) | C (g) | D (g) | W/B |
|---|---|---|---|---|---|---|
| 1 | 100 | 4500 | 0 | 8 | 0.1 | 0.4 |
| 2 | 100 | 4500 | 5 | 8 | 0.1 | 0.4 |
| 3 | 100 | 95% 4500 &5% 12000 | 0 | 8 | 0.1 | 0.4 |
| 4 | 100 | 95% 4500 &5% 12000 | 5 | 8 | 0.1 | 0.4 |

Figure 20:
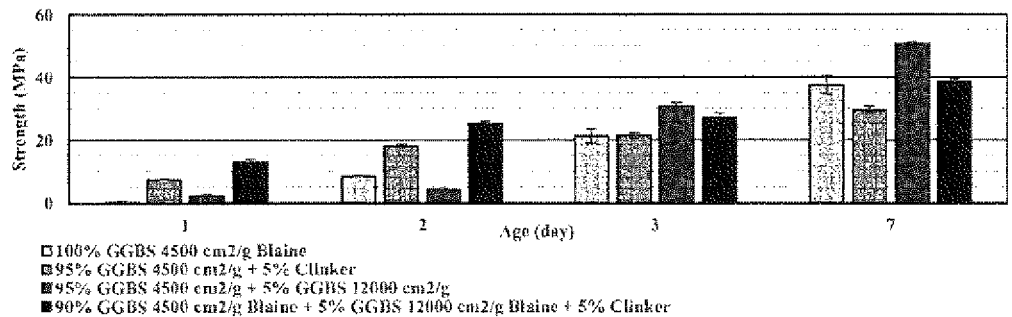

Compressive Strength (Strength MPa): Confer Supra Example 5.
Results:
The results are shown in FIG. 20. Improving of compressive strengths is achieved with partial replacement of GGBS by Ultrafine GGBS, by combination of partial replacement of GGBS by Ultrafine GGBS with GGBS replacement by ordinary Portland clinker.

Example 21: Embodiment $E^{b2}$

Materials:
1) As A—GGBS as described in example 1
2) As B—OPC clinker with different Blaine fineness.
3) As C—anhydrous sodium carbonate ($Na_2CO_3$), 99% purity.
4) As D—HEDP*4Na Tested Compositions:

| Assays | A (g) | B (g) | B fineness ($cm^2$/g Blaine) | C (g) | D (g) | W/B |
|---|---|---|---|---|---|---|
| 1 | 100 | 5 | 2500 | 8 | 0.1 | 0.4 |
| 2 | 100 | 5 | 4000 | 8 | 0.1 | 0.4 |
| 3 | 100 | 5 | 6000 | 8 | 0.1 | 0.4 |

Figure 21:
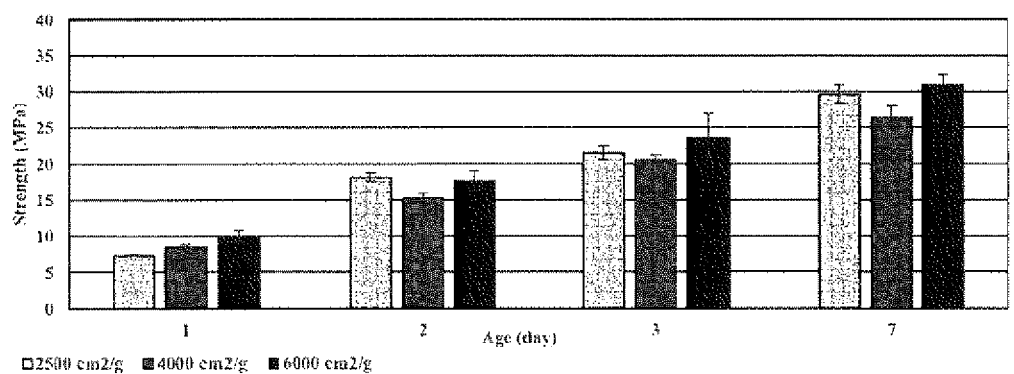

Compressive Strength (Strength MPa): Confer Supra Example 5.
Results:
The results are shown in FIG. 21. Increasing of fineness of B leads to a greater strength at early age.

Example 22: Embodiment $E^{b2}$

Materials:
1) As A—GGBS as described in example 1
2) As B—OPC clinker with a Blaine fineness of 6000 $cm^2$/g.
3) As C—anhydrous sodium carbonate ($Na_2CO_3$), 99% purity.
4) As D—HEDP*4Na Tested Compositions:

| Assays | A (g) | B (g) | C (g) | D (g) | W/B |
|---|---|---|---|---|---|
| 1 | 100 | 0 | 8 | 0.1 | 0.4 |
| 2 | 100 | 5 | 8 | 0.1 | 0.4 |

Figure 22:
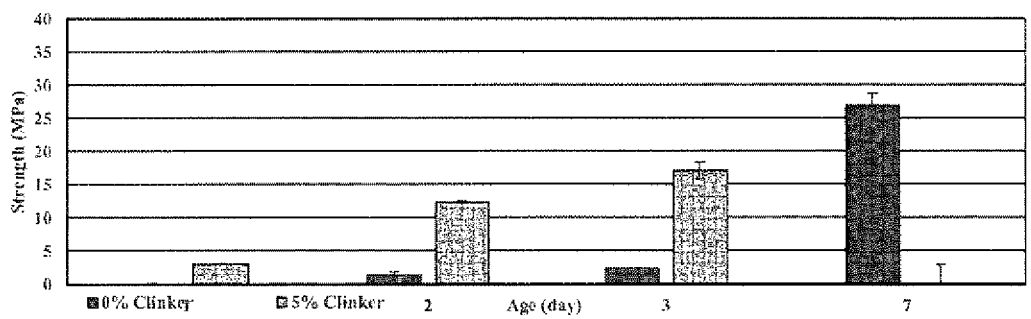

Compressive Strength (Strength MPa): Confer Supra Example 5, Except that the Storage Temperature is 15° C. Instead of 22° C.
Results:
The results are shown in FIG. 22. Partial replacement of A by B have a great influence on early age strength evolution.

Example 23: Embodiment $E^{b2}$

Materials:
1) As A—GGBS as described in example 1
2) As B—OPC clinker with a Blaine fineness of 6000 $cm^2$/g.
3) As C—anhydrous sodium carbonate ($Na_2CO_3$), 99% purity.
4) As D—HEDP*4Na Tested Compositions:

| Assays | A (g) | B (g) | C (g) | D (g) | W/B |
|---|---|---|---|---|---|
| 1 | 100 | 0 | 6 | 0.1 | 0.4 |
| 2 | 100 | 5 | 6 | 0.1 | 0.4 |

Figure 23:
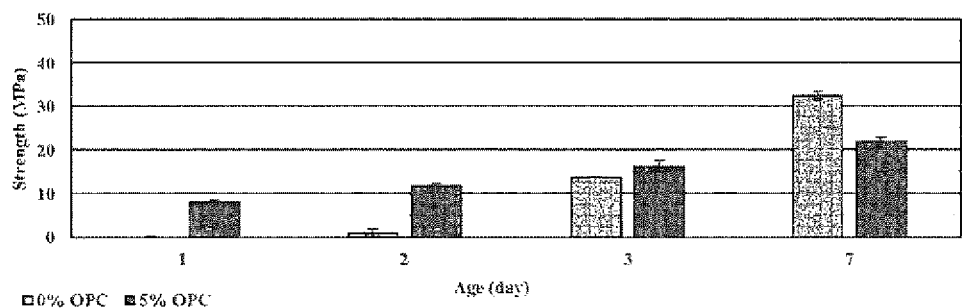

Compressive Strength (Strength MPa): Confer Supra Example 5.
Results:
The results are shown in FIG. 23. Partial replacement of GGBS by OPC increase early age compressive strength (1-3 days).

Example 24: Embodiment $E^{b2}$

Materials:
1) As A—GGBS as described in example 1
2) As B $NaAlO_2$
3) As C—anhydrous sodium carbonate ($Na_2CO_3$), 99% purity.
4) As D—HEDP*4Na Tested Compositions:

| Assays | A (g) | B (g) | C (g) | D (g) | W/B |
|---|---|---|---|---|---|
| NC10-R | 100 | 0 | 10 | 0.1 | 0.4 |
| NC10-005 | 100 | 0.05 | 10 | 0.1 | 0.4 |
| NC8-R | 100 | 0 | 8 | 0.1 | 0.4 |
| NC8-005 | 100 | 0.05 | 8 | 0.1 | 0.4 |

Yield Stress (Pa): Confer Supra Example 2.

Figure 24A:
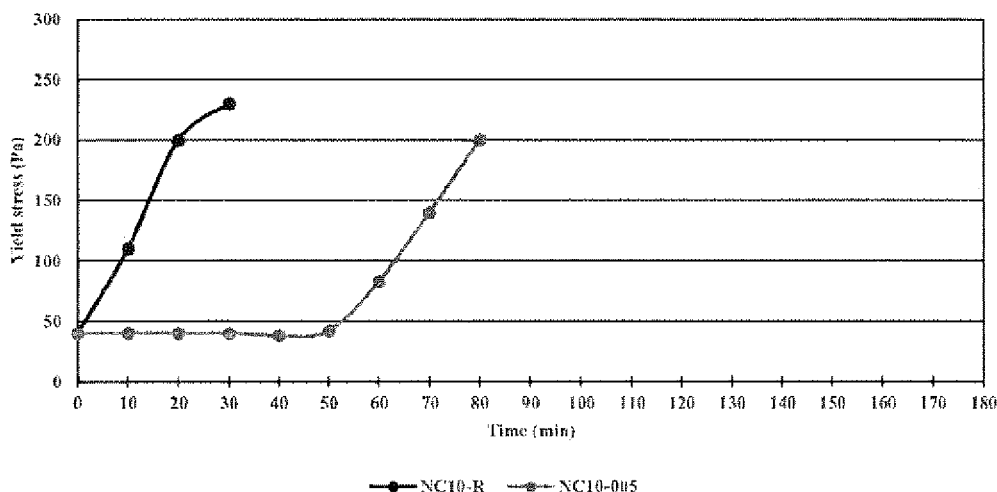
FIG. 24A and 24B are graphics represented yield stress versus time.
Figure 24B:
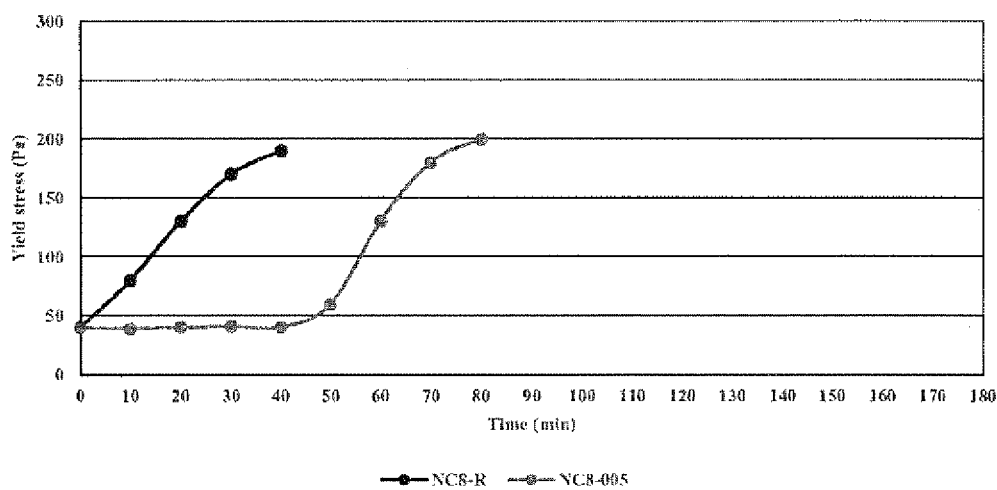

Results:
The results are shown in FIGS. 24A & 24B. Addition of alumina source (here NaAlO2) as co-binder B, leads to a deceleration of yield stress evolution in time without decreasing of the yield stress.

Example 25: Embodiment $E^{b2}$

Figure 25A:
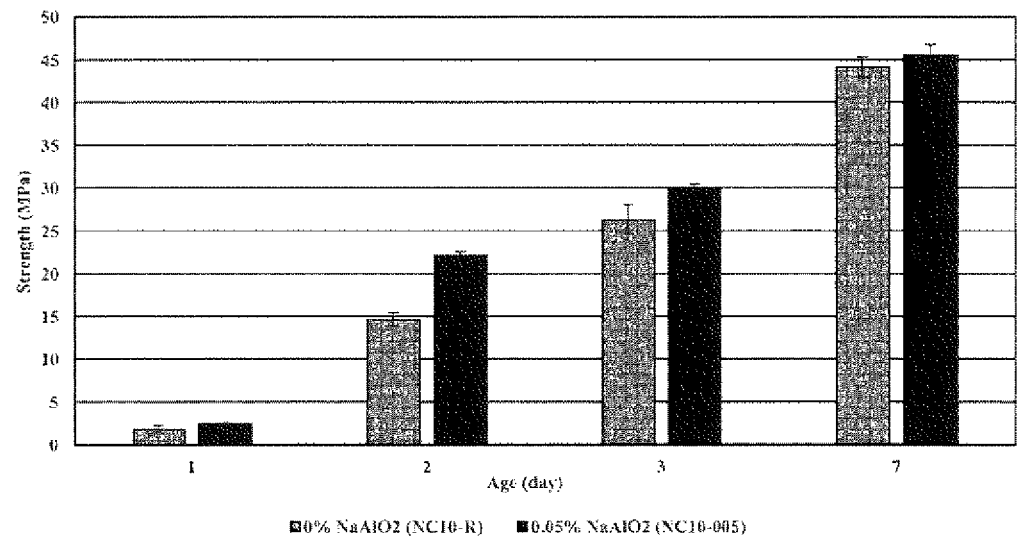
FIGS. 25A and 25B are bar diagrams showing strength versus time.
Figure 25B:
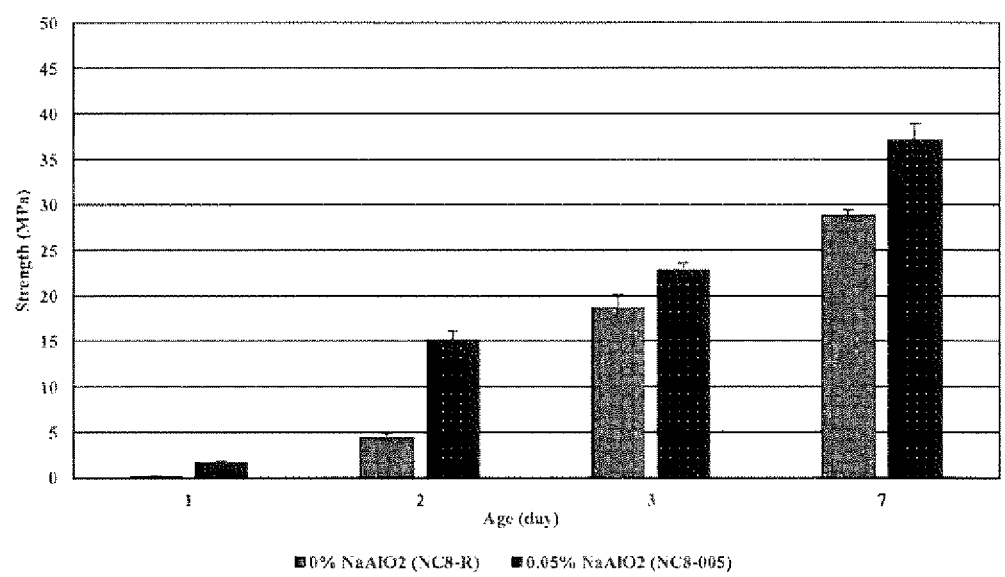

Materials: as in example 24
Tested compositions: as in example 24
Compressive strength (Strength MPa): confer supra example 5.
Results:
The results are shown in FIGS. 25A & 25B. Addition of alumina source (here NaAlO2) as co-binder B, leads to an increase of early and late compressive strength.

The invention claimed is:
1. Slag-based binder comprising:
  A. at least one slag being ground granulated blast furnace slag;
  A'. optionally at least one $CO_3$-containing mineral powder;
  B. optionally at least one co-binder different from binder A. and from $CO_3$ powder A'.;
  C. at least one activator of a water/slag reaction;
  C'. optionally at least one co-activator C', different from C;
  D. at least one chelatant selected from the group consisting of PBTC (phosphonobutane-1,2,4-tricarboxylic acid), ATMP (amino-trimethylene phosphonic acid), HEDP (1-hydroxyethylidene-1,1-diphosphonic acid), DTPA (diethylenetriaminopenta-acetic acid), DCTA (diaminocyclohexanetetra-acetic acid), PAA (polyacrylic acid), PPCA (phosphino-polyacrylates), PMA (polymaleic acids), MAT (maleic acid terpolymers), SPOCA (sulfonated phosphonocarboxylic acid), PPCA (Poly-Phosphono Carboxylic acid), EDTMP (ethylenediamine-tris[methylene phosphonic acid]) and DTPMP (Diethylenetriamine-penta[methylene phosphonic acid]), theirs derivatives, their salts and mixes thereof;
  E. and, optionally, at least one superplasticizer different from the chelatant D,
  wherein the slag A is a powder selected from the group of granulometric classes consisting of:
    a1) wherein D50 is in the range]7.0-100.0 μm];
    a2) wherein D50 is in the range]3.0-7.0] μm;
    a3) wherein D50 is in the range]0.5-3.0] μm;
    a4) and mixes thereof.
2. The binder according to claim 1, wherein the slag A is selected from the group of granulometric classes consisting of:
  a1) wherein D50 is in the range]7.0-60 μm];
  a3) wherein D50 is in the range [1.0-2.0] μm;
  a4) and mixes thereof.
3. The binder according to claim 1, wherein the $CO_3$-containing mineral A' is selected from the group consisting of limestone, dolomite, precipitated $CaCO_3$, chalk, marble, aragonite, travertine, tufa and their mixes.
4. The binder according to claim 1, wherein the $CO_3$-containing mineral A', is a powder or a slurry, selected from the group of granulometric classes:
  a'1) wherein D50 is in the range]250 μm-40 mm];
  a'2) wherein D50 is in the range]16.0-250.0] μm
  a'3) wherein D50 is in the range]6.0-16.0] μm;
  a'4) wherein D50 is in the range]3.0-6.0] μm;
  a'5) wherein D50 is in the range]0.9-3.0] μm;
  a'6) wherein D50 is in the range]0.02-0.9] μm;
  a'7) and mixes thereof.
5. The binder according to claim 1, wherein at least one co-binder B, different from slag A, is present, said co-binder B including at least one compound selected from the group consisting of slaked/quick lime, hydrated lime, supersulfated cements, calcium aluminate cements, calcium sulfoaluminate cements, Portland cements, Portland ground clinkers (classes F and/or C) fly ashes, pozzolanic binders, (classes F and/or C) natural and synthetic pozzolans, silica fumes, rice husk ashes, paper sludge ashes, bottom ashes, incinerated bottom ashes, recycled glasses, steel slags, phosphorous slags, ladle slags, red muds, cement kiln dusts, biomass ashes, and mixes thereof.
6. The binder according to claim 1, wherein at least one co-binder B, different from slag A, is present, said co-binder B comprising at least one Layer Double Hydroxide (LDH) and/or at least one precursor for in-situ LDH formation.
7. The binder according to claim 6 wherein the LDH(s) is characterized by the general formula (I):

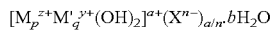

wherein $M_p^{z+}$ $M'^{y+}_q$ are metal cations or mixtures of metal cations; z=1 or 2; y=3 or 4; p+q=1; b=0 to 10; $X^{n-}$ is an anion, and n is 1 to 5 and a is determined by p, q, y, and z such that a=zp+yq−2.
8. The binder according to claim 6, wherein the LDH precursor is selected from the group consisting of
  i. ordinary Portland cement (OPC) ground clinker mineral;
  ii. OPC;
  iii. slag powder wherein D50 is in the range]1.0-5.0] μm;
  iv. an alumina source;
  v. a ferric source;
  vi. a magnesium source;
  vii. a calcium source;
  viii. a lithium source;
  ix. a zinc source;
  x. a manganese source;
  xi. a copper source;
  xii. minerals belonging to the hydrotalcite supergroup; and
  xiii. mixtures thereof.
9. The binder according to claim 6, wherein the co-binder B concentration-in % dry w/w with respect to A, to A&A', to A&B or to A&A'&B, is in the following range: [0-50].
10. The binder according to claim 1, containing at least one superplasticizer E, wherein the at least one superplasticizer E is a compound selected from the group consisting of NBSP (naphthalene based superplasticizers), PNS (polynaphthalene sulphonates), MBSP (melamine based superplasticizers), PMS (polymelamine sulphonates), HCA (hydroxycarboxylic acids), (P)AA [(poly)acrylic acids], LS (lignosulfonates), PCE (polycarboxylic ethers), PCA (polycarboxylic acids), phosphonates, the salts and/or the derivatives of these compounds and mixes of these compounds.
11. The binder according to claim 7, wherein M is selected from the group consisting of Mn, Li, Mg, Zn, Fe, Ni, Co, Cu, Ca, and a mixture of two or more thereof.
12. The binder according to claim 7, wherein y is 3 and M' is selected from the group consisting of Cr, Mn, Co, V, Sc, Al, Ga, Fe, and a mixture thereof.
13. The binder according to claim 7, wherein M/M' is selected from the group consisting of Zn/Al, Ni/Al, Mg/Al, and/or Ca/Al.
14. A kit comprising at least a part of the components of the binder according to claim 1 and instructions for the preparation of a wet formulation comprising said binder, at least one aggregate and water in a quantity such that the ratio Water/Binder (W/B) is in the following range:

$$0.1 \leq W/B \leq 1.$$

15. A dry composition comprising the binder according to claim 1, and at least one aggregate.

16. A wet formulation comprising the binder according to claim 1, at least one aggregate and water in a quantity such that the ratio Water/Binder (W/B) is in the following range:

$$0.15 \leq W/B \leq 0.5.$$

17. A method for the preparation of the wet formulation according to claim 16 comprising mixing of the binder, the aggregate and the water in a quantity such that the ratio Water/Binder (W/B) is in the following range:

$$0.15 \leq W/B \leq 0.5.$$

18. The method according to claim 17, wherein a part of the binder and at least a part of the water are mixed together prior to the mixing with the aggregate.

* * * * *